(12) United States Patent
Chen et al.

(10) Patent No.: US 9,071,074 B2
(45) Date of Patent: Jun. 30, 2015

(54) MULTI-STANDARD, ALTERNATING CURRENT OR DIRECT CURRENT COMPATIBLE ELECTRIC VEHICLE SUPPLY EQUIPMENT

(71) Applicant: EATON CORPORATION, Cleveland, OH (US)

(72) Inventors: Jiong Chen, Shanghai (CN); Dongxiao Wu, Shanghai (CN); Robert Yanniello, Asheville, NC (US); Yahan Hua, Shanghai (CN); Bin Lu, Shanghai (CN)

(73) Assignee: EATON CORPORATION, Cleveland, OH (US)

( * ) Notice: Subject to any disclaimer, the term of this patent is extended or adjusted under 35 U.S.C. 154(b) by 427 days.

(21) Appl. No.: 13/663,640

(22) Filed: Oct. 30, 2012

(65) Prior Publication Data

US 2013/0214738 A1     Aug. 22, 2013

(30) Foreign Application Priority Data

Feb. 20, 2012   (CN) .......................... 2012 1 0039866
Feb. 20, 2012   (CN) .......................... 2012 1 0040246

(51) Int. Cl.
*H02J 7/00*       (2006.01)
*B60L 11/00*     (2006.01)
(Continued)

(52) U.S. Cl.
CPC ............... *H02J 7/02* (2013.01); *Y02T 10/7005* (2013.01); *Y02T 90/16* (2013.01); *H02J 7/0047* (2013.01); *H02J 2007/0096* (2013.01); *B60L 3/0023* (2013.01); *B60L 11/1818* (2013.01); *B60L 11/1846* (2013.01); *B60L 11/1862* (2013.01); *B60L 2230/12* (2013.01); *B60L 2230/16* (2013.01); *B60L 2240/545* (2013.01); *B60L 2240/547* (2013.01); *B60L 2270/40* (2013.01); *Y02T 10/7088* (2013.01); *Y02T 10/7044* (2013.01); *Y02T 10/705* (2013.01); *Y02T 90/163* (2013.01); *Y02T 90/169* (2013.01);
(Continued)

(58) Field of Classification Search
CPC .............. B60L 11/182; B60L 11/1838; B60L 11/1818; B60L 11/1846; B60L 11/1862; H02J 7/02; H02J 7/0047
USPC ........................................... 320/109; 701/22
See application file for complete search history.

(56) References Cited

U.S. PATENT DOCUMENTS 7,830,117 B2 * 11/2010 Ambrosio et al. ............ 320/109
8,890,473 B2 * 11/2014 Muller et al. .................. 320/109
(Continued)

*Primary Examiner* — M'Baye Diao
(74) *Attorney, Agent, or Firm* — Eckert Seamans Cherin & Mellott, LLC; Philip E. Levy; Kirk D. Houser

(57) ABSTRACT

A multi-standard compatible electric vehicle supply equipment includes a plurality of different electric vehicle connectors each of which corresponds to one of a plurality of different electric vehicle standards. A power converter inputs alternating current power and includes an output to output direct current power. A circuit is structured to selectively electrically connect a source of alternating current power to a number of the electric vehicle connectors, selectively electrically connect the output of the power converter to a selected one of the different electric vehicle connectors, employ a plurality of different communication protocols for the different electric vehicle connectors, detect connectivity of one of the different electric vehicle connectors with an electric vehicle and responsively select one of a plurality of different charging modes, and communicate with the electric vehicle through the selected one of the different electric vehicle connectors.

20 Claims, 13 Drawing Sheets

(51) Int. Cl.
  *H02J 7/02* (2006.01)
  *B60L 3/00* (2006.01)
  *B60L 11/18* (2006.01)

(52) U.S. Cl.
  CPC ............... *Y02T 90/121* (2013.01); *Y02T 90/14* (2013.01); *Y02T 90/128* (2013.01); *Y04S 30/14* (2013.01)

(56) References Cited

U.S. PATENT DOCUMENTS

| | | | |
|---|---|---|---|
| 2010/0106351 A1* | 4/2010 | Hanssen et al. | 701/22 |
| 2011/0109158 A1* | 5/2011 | Olsen | 307/10.1 |
| 2011/0144823 A1* | 6/2011 | Muller et al. | 700/297 |
| 2012/0176237 A1* | 7/2012 | Tabe | 340/539.12 |
| 2013/0169226 A1* | 7/2013 | Read | 320/109 |

\* cited by examiner

MULTI-STANDARD, ALTERNATING CURRENT OR DIRECT CURRENT COMPATIBLE ELECTRIC VEHICLE SUPPLY EQUIPMENT

CROSS-REFERENCE TO RELATED APPLICATIONS

This application claims the benefit of Chinese Patent Application Serial No. 2012100398664, filed Feb. 20, 2012, which is incorporated by reference herein; and also claims the benefit of Chinese Patent Application Serial No. 2012100402462, filed Feb. 20, 2012, which is incorporated by reference herein.

BACKGROUND

1. Field

The disclosed concept pertains generally to electric vehicles (EVs) and, more particularly, to electric vehicle supply equipment (EVSE), such as chargers for EVs.

2. Background Information

With the development of electric vehicle technology, the number of electric vehicles (EVs) is growing rapidly, and electric vehicle charging stations, similar to gas stations, have become popular.

An electric vehicle (EV) charging station, also called an EV charging station, electric recharging point, charging point, and EVSE (Electric Vehicle Supply Equipment), is an element in an infrastructure that supplies electric energy for the recharging of electric vehicles, plug-in hybrid electric-gasoline vehicles, or semi-static and mobile electrical units such as exhibition stands.

An EV charging station is a device that safely allows electricity to flow. These charging stations and the protocols established to create them are known as EVSE, and they enhance safety by enabling two-way communication between the charging station and the electric vehicle.

The 1996 NEC and California Article 625 define EVSE as being the conductors, including the ungrounded, grounded, and equipment grounding conductors, the electric vehicle connectors, attachment plugs, and all other fittings, devices, power outlets or apparatus installed specifically for the purpose of delivering energy from premises wiring to an electric vehicle.

EVSE is defined by the Society of Automotive Engineers (SAE) recommended practice J1772 and the National Fire Protection Association (NFPA) National Electric Code (NEC) Article 625. While the NEC defines several safety requirements, J1772 defines the physical conductive connection type, five pin functions (i.e., two power pins (Hot1 and Hot2 or neutral; or Line 1 and Line 2), one ground pin, one control pilot pin, and one proximity pin), the EVSE to EV handshake over the pilot pin, and how both parts (EVSE and EV) are supposed to function.

Two-way communication seeks to ensure that the current passed to the EV is both below the limits of the EV charging station itself and below the limits of what the EV can receive. There are additional safety features, such as a safety lock-out, that does not allow current to flow from the EV charging station until the EV connector or EV plug is physically inserted into the EV and the EV is ready to accept energy. For example, J1772 in North America uses a very simple but effective pilot circuit and handshake in the EVSE.

EV charging stations consist generally of a completely separate and special box with indicators for power and state along with a connected EV cable/connector for the intended purpose of charging the EV.

The connection between an electric vehicle and a charger within a charging station (also known as an EV charger) which supplies the EV with direct current during the charging process is shown in FIG. 1a. A charger 10 includes power converter 12, which further includes a system controller 122 and a power module 121. An electric vehicle 20 includes a battery management system (BMS) 21 and a battery 22. The system controller 122 is coupled to the BMS 21.

After the coupling of the charging circuit of the electric vehicle 20 and the charger 10, the system controller 122 and the BMS 21 send data to each other according to predefined protocols. The system controller 122 controls the power module 121, which charges the battery 22.

There are various types of communication protocols between system controller 122 and BMS 21, including, for example and without limitation, CHAdeMO, SAE (Society of Automotive Engineers), and IEC (International Electrotechnical Commission), as shown in Table 1.

TABLE 1

| Coupler Standard | Communication Protocol |
|---|---|
| SAE J1772 | Physical circuit of the communication protocol is power line carrier communication (PLC) |
| IEC 62196-3 | EC 61851-24 (over CAN bus) |
| JEVS G105-1993 | CHAdeMO (over CAN bus) |
| Chinese GB | Chinese GB |

SAE J1772 and IEC (IEC 62196-3) include coupler standards and communication protocol standards. Chinese GB is a national standard of China, which includes a coupler standard and a communication protocol standard. Each communication protocol has specific protocol specifications with respective address allocation modes, data package definitions and functions.

Therefore, as shown in FIG. 1b, an EV charger following a specific protocol can only connect to the BMS following the same protocol and charge electric vehicles following the same communication protocol, resulting in dedicated chargers for each protocol.

SAE has proposed a J1772 "Combo Coupler" or "combo connector" as an extension of J1772™. The J1772 combo connector includes additional pins to accommodate relatively fast DC charging at 200-450 Volts DC and up to 90 kW, and can employ Power Line Carrier (PLC) technology to communicate between an electric vehicle (EV), an off-board EV charger, and a smart grid. The J1772 combo connector includes AC L1, L2 and DC L1, L2 into the connector standard.

The CHAdeMO association and the China Standardization Committee also published a DC connector and communication standard between the EV and the EV charger.

While SAE's combo connector design indicates one technology trend during a transition period, an EV charger is desired to have the capability of both AC and DC.

There is room for improvement in electric vehicle supply equipment.

SUMMARY

These needs and others are met by embodiments of the disclosed concept in which multi-standard compatible electric vehicle supply equipment charges electric vehicles with a plurality of different electric vehicle connectors, a plurality of different communication protocols, and selectively electrically connects a source of alternating current power to a number of the different electric vehicle connectors or selectively electrically connects a direct current output of a power converter to a selected one of the different electric vehicle connectors.

In accordance with one aspect of the disclosed concept, a multi-standard compatible electric vehicle supply equipment comprises: a plurality of different electric vehicle connectors each of which corresponds to one of a plurality of different electric vehicle standards; a power converter structured to input alternating current power and including an output structured to output direct current power; a first switch structured to selectively electrically connect a source of alternating current power to a number of the different electric vehicle connectors; a second switch structured to selectively electrically connect the output of the power converter to a selected one of the different electric vehicle connectors; a protocol interpretation and mapping component structured to employ a plurality of different communication protocols for the different electric vehicle connectors; an interface between the protocol interpretation and mapping component and the power converter; a first circuit structured to detect connectivity of one of the different electric vehicle connectors with an electric vehicle and responsively select one of a plurality of different charging modes, and to control the first switch, the second switch and a plurality of third switches; a second circuit structured to communicate with the electric vehicle through the selected one of the different electric vehicle connectors; and the plurality of third switches structured to electrically connect the protocol interpretation and mapping component to one of the first and second circuits.

The different electric vehicle connectors may include a plurality of different electric vehicle connectors having a direct current output and a number of electric vehicle connectors having either a direct current output or an alternating current output.

A number of the different electric vehicle connectors are structured to charge the electric vehicle with either a direct current output powered through the second switch or an alternating current output powered through the first switch.

As another aspect of the disclosed concept, a multi-standard compatible electric vehicle supply equipment comprises: a plurality of different electric vehicle connectors each of which corresponds to one of a plurality of different electric vehicle standards; a power converter structured to input alternating current power and including an output structured to output direct current power; and a circuit structured to selectively electrically connect a source of alternating current power to a number of the electric vehicle connectors, selectively electrically connect the output of the power converter to a selected one of the different electric vehicle connectors, employ a plurality of different communication protocols for the different electric vehicle connectors, detect connectivity of one of the different electric vehicle connectors with an electric vehicle and responsively select one of a plurality of different charging modes, and communicate with the electric vehicle through the selected one of the different electric vehicle connectors.

The power converter may comprise an alternating current to direct current power converter having a direct current output; the circuit may be structured to selectively electrically connect the direct current output to the selected one of the different electric vehicle connectors; and the circuit may comprise a protocol interpretation and mapping component and a universal interface between the protocol interpretation and mapping component and the alternating current to direct current power converter, the universal interface communicating with a unified internal protocol to the alternating current to direct current power converter.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1A:
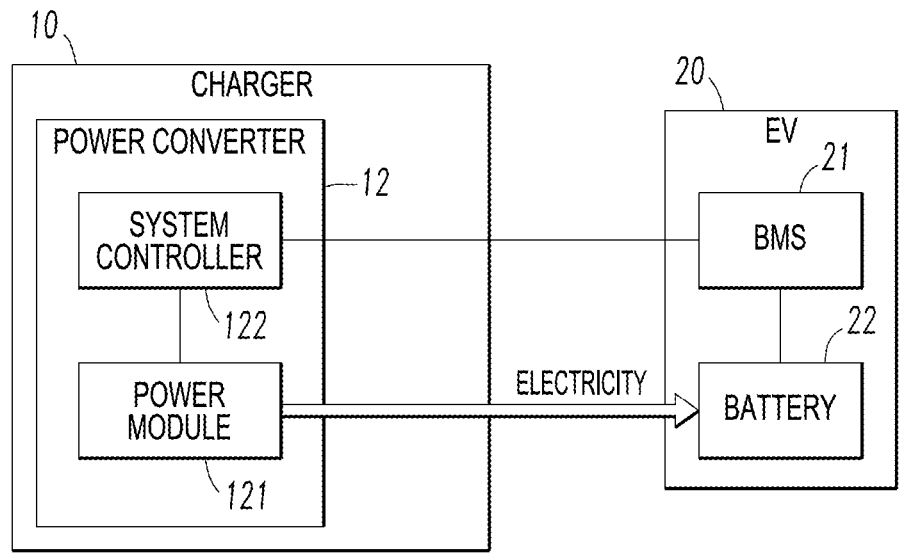
FIG. 1a is a block diagram in schematic form of a connection between an EV charger in a charging station and an electric vehicle being charged by direct current.

As employed herein, the term "number" shall mean one or an integer greater than one (i.e., a plurality).

As employed herein, the term "switch" shall mean a mechanical switch, an electrical switch, an electronic or solid-state switch, an electro-mechanical switch, or a device structured to open or close a circuit.

As employed herein, the term "source of alternating current power" shall mean a transformer; a step-down transformer; an internal source of alternating current power; or an external source of alternating current power.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with CHAdeMO, SAE and IEC communication protocols, although the disclosed concept is applicable to a wide range of different communication protocols.

The disclosed concept is described in association with CHAdeMO, SAE and Chinese GB electric vehicle connectors, although the disclosed concept is applicable to a wide range of different electric vehicle connectors.

The disclosed concept employs an AC input voltage to the EVSE charger and provides for either DC or AC output to the EV. The Society of Automotive Engineers (SAE) has developed a vehicle connector that has contacts for both AC and DC. However, not all EVs have DC charging capability.

The disclosed concept allows an EV with either AC or DC charging capability to be charged from the same EVSE without the need for a completely independent EVSE. A single control system is used in a common EVSE for either the AC or DC charging session. The disclosed EVSE provides charging capability to EVs complying with SAE AC, SAE DC L1, L2, CHAdeMO ("CHArge de MOve") (equivalent to "charge for moving"), and other suitable DC standards. The EVSE output can be either AC or DC. All EVs with DC charge capability have, as a minimum, the ability to be charged from a 120 V source in an emergency or when charging time is not an issue. Some, but not all, DC EVs also have 240 VAC charging capability. The EVSE or charging station disclosed herein will charge an EV with either AC or DC, but will not charge two EVs simultaneously.

While it is believed that SAE's combination connector design indicates one technology trend, during a transition period, the disclosed EV charger is desired to have the capability of either AC or DC outputs to the EV. The disclosed concept covers an AC and DC compatible EVSE along with the methodology to automatically select the corresponding charging mode. Basically, there are two ways of charging: AC and DC. For AC, the AC-DC converter is part of the EV. SAE specifies the AC charging mode. For DC, the AC-DC converter is part of the EVSE, which provides relatively large output power to the EV battery. SAE, CHAdeMO and Chinese GB charger couplers all employ the DC charging standard. The selection information is provided from the detection of connection of the couplers. As to distinguishing between the SAE AC and the SAE DC, whether the AC or the DC charging circuit should be connected depends on the detection of DC pins on the coupler.

The disclosed concept also selects between different communication protocols, and the connection of couplers indicates which DC charging standard should be employed. By making the EVSE be more adaptive to EVs, one EVSE can charge more EVs with different charging modes and standards. Both AC and DC outputs are included. This provides compatibility with EVs that are capable of AC only or AC and DC charging.

In order to have an EV charger (e.g., without limitation, a DC EV charger) charge electric vehicles following different communication protocols, the power converter within the EV charger can be reused for different standards. That is, the power converter needs to receive and understand instructions under different communication protocols. In this way, during a charging process, the power converter is firstly informed of the type of communication protocol followed by the battery management system (BMS) of the electric vehicle, which is connected to the EV charger. Then, the power converter communicates with the BMS via the right type of communication protocol.

Figure 2:
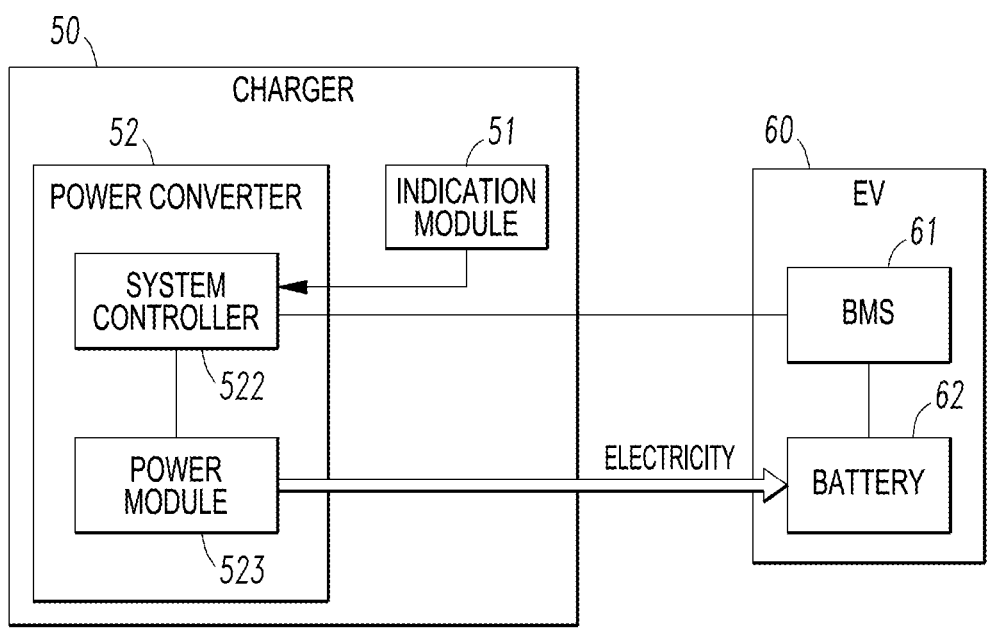
FIGS. 2-4 are block diagrams in schematic form of multi-standard compatible EV chargers in accordance with embodiments of the disclosed concept.
Figure 1B:
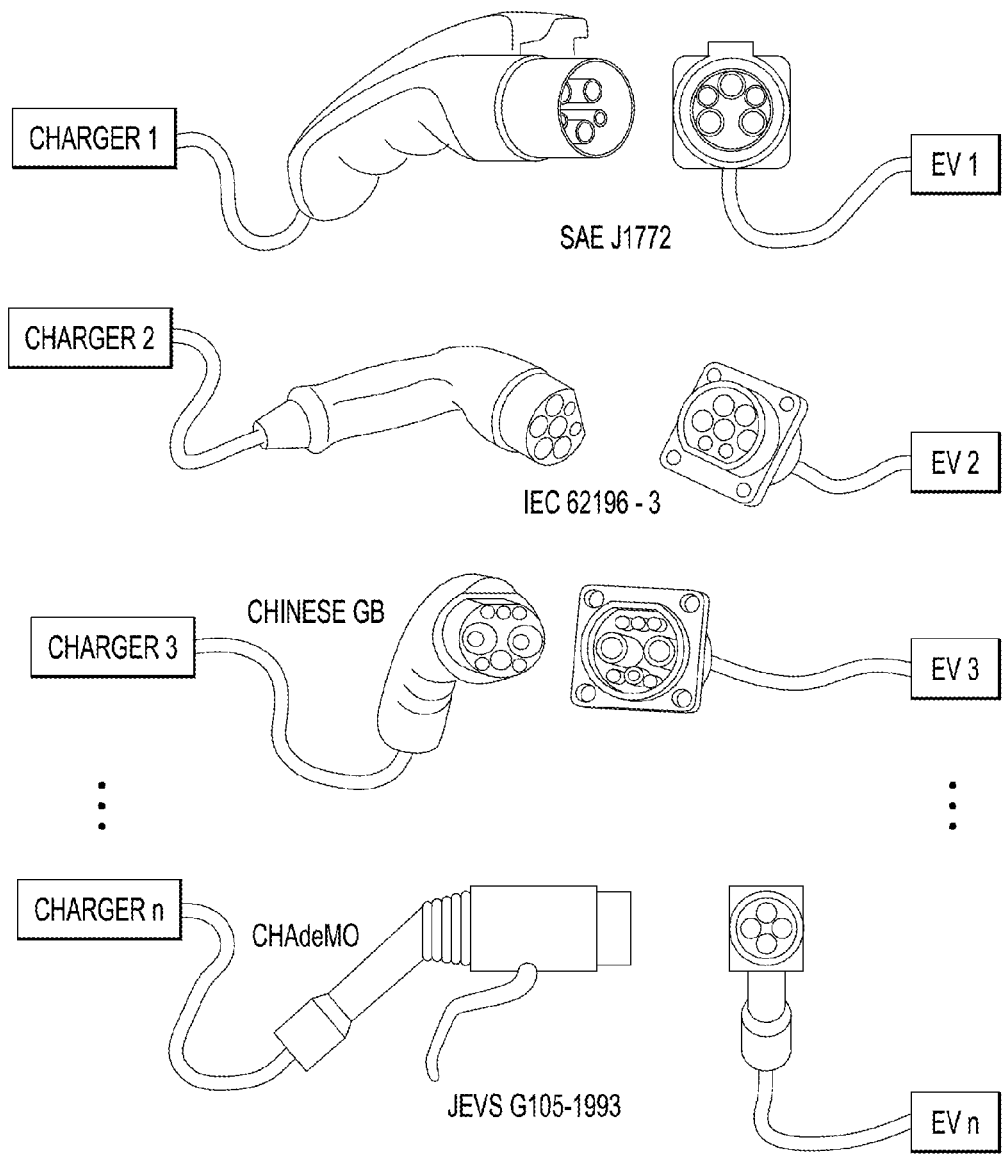
FIG. 1b is a block diagram in schematic form of couplers of various protocols followed by electric vehicles and EV chargers.

Referring to FIG. 2, a multi-standard compatible EV charger 50 includes an indication module 51 and a power converter 52 coupled to the indication module 51. The power converter 52 further includes a system controller 522 and a power module 523.

In this embodiment, the system controller 522 is capable of analyzing instructions under a plurality of prevalent communication protocols, including, for example and without limitation, CHAdeMO, SAE and IEC. The system controller 522, which has an interface compatible with messages or instructions of the plurality of communication protocols, is adapted to receive messages or instructions of the plurality of communication protocols and to configure the output power of the power module 523 according to the received messages or instructions. The indication module 51 is coupled to the system controller 522, and sends an indication message to the system controller 522 to inform the system controller 522 of the type of communication protocol followed by the currently connected electric vehicle 60 (specifically the BMS 61). The system controller 522 is adapted to establish communication with the BMS 61 depending on the type of communication protocol within the indication message and is adapted to control the power module 523 when it is charging the electric vehicle 60 (specifically the battery 62).

In addition, the indication module 51, which is positioned on the EV charger 50, can receive operations of an operator to generate the indication message.

Because couplers of existing EV chargers and electric vehicles correspond to different specific communication protocols (i.e., a certain communication protocol for a certain coupler), when a coupler is electrically connected, the indication module 51 is configured to identify the type of communication protocol followed by the electric vehicle 60 according to the coupler's identifier. In this way, the indication module 51 automatically identifies the type of communication protocol followed by the electric vehicle 60, and in turn, the whole charging process can be finished automatically.

Because the number of standards for electric vehicles is large and growing rapidly, the power converter 52 needs to be compatible with emerging communication protocols.

Figure 3:
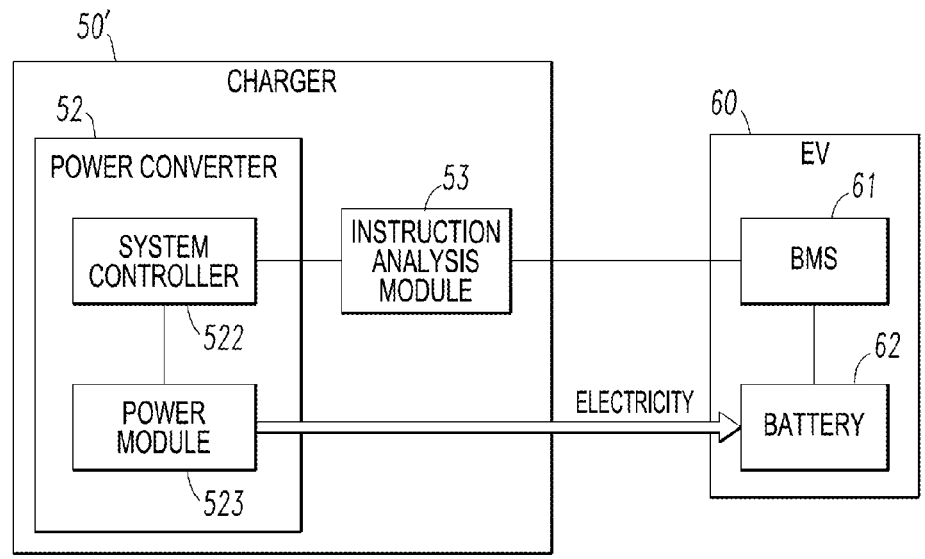

As shown in FIG. 3, another multi-standard compatible EV charger 50' includes an instruction analysis module 53 and a power converter 52. The power converter 52 further includes a system controller 522 and a power module 523. The instruction analysis module 53 is coupled to the system controller 522 and the BMS 61, forwarding data between the system controller 522 and the BMS 61.

In this embodiment, the instruction analysis module 53 is configured to analyze instructions under a plurality of existing communication protocols, including, for example and without limitation, CHAdeMO, SAE, IEC, Southern Grid (China Southern Power Grid), and GB (the Chinese national standard), and is configured to establish mapping relationships among the messages under these protocols. The instruction analysis module 53 is configured to map messages under various protocols onto messages under the protocol followed by the system controller 522. In this way, no matter what communication protocol the system controller 522 follows, the system controller 522 will establish communication with the BMS 61 and control the power module 523 to charge the electric vehicle 60 (specifically the battery 62).

An example of mapping relationships among messages from prevalent communication protocols is shown in Table 2, which illustrates data-field mapping relationships among messages from Southern Grid, GB and CHAdeMO (wherein PS is short for PDU Specific, which can be considered as a target address).

TABLE 2

| Content | Southern Grid Name | Southern Grid Data field | GB Name | GB Data field | CHAdeMO PS | CHAdeMO Data field |
|---|---|---|---|---|---|---|
| Maximum output voltage | CML | 1, 2 | CMTL | 1, 2 | 108H | 2, 3 |
| Maximum output current | CML | 3, 4 | CMTL | 3, 4 | 108H | 4 |
| Maximum output power | CML | 5, 6 | CMTL | 5, 6 | Null | |
| Output voltage request | BCL | 1, 2 | BCLR | 1, 2 | 102H | 2, 3 |
| Output current request | BCL | 3, 4 | BCLR | 3, 4 | 102H | 4 |
| Output power request | BCL | 5, 6 | BCLR | 5, 6 | Null | |
| Charging mode | BCL | 7 | BCLR | 7 | default | |
| Configuration confirm | CRO | 1 | CCRM | 1 | 109H | 6 |
| Start communication | Null | | Null | | Null | |
| Battery ID | BRM | 1~16 | BRM | 1, 2, 3, 4 | Null | |
| Start charging | BRO | 1 | BCRM | 1 | 102H | 4 |
| Stop reason | BST | 1 | BACM | 1 | 102H | 5 |
| Stop charging | BST | Indirect | BACM | 4 | 102H | 6 |
| Error type | CST | 2 | CACM | 2 | 109H | 6 |
| Present output voltage | CCS | 1, 2 | CCS | 1, 2 | 109H | 2, 3 |
| Present output current | CCS | 3, 4 | CCS | 3, 4 | 109H | 4 |
| Present output power | Null | | Null | | Null | |
| Charging time | CCS | 5, 6 | CCS | 5, 6 | Null | |
| Remaining time | BCS | 7 | BCS | 8 | 109H | 7, 8 (extended) |
| Total charging time | Null | | Null | | Null | |
| State of charge | BCS | 6 | BCS | 7 | 102H | 7 |
| Battery temperature | BCS | 5 | BCS | 5(min), 6(max) | Null | |

In another embodiment (not shown), the instruction analysis module 53 can also be positioned outside of the EV charger 50'.

In the embodiments where an instruction analysis module 53 is included, because of the addition thereof, when there is a new type of communication protocol or an update of an existing communication protocol, the instruction analysis module 53 is the only unit to be updated. The power converter 52 of the EV charger 50' need not be replaced. In this way, the same power converter 52 is reused to charge electric vehicles following different communication protocols.

In the above embodiments, the instruction analysis module 53 communicates with the power converter 52 via the communication protocol followed by the power converter 52. Thus, the types of instruction analysis modules multiply quickly.

To solve this problem, according to another embodiment of the disclosed concept, there is provided a unified internal communication protocol between the instruction analysis module 53 and the power converter 52. The instruction analysis module 53 here can also be referred to as a data transmission device (e.g., 31 of FIG. 4), which is responsible to perform transformation operations (i.e., communication protocol mapping) between the internal communication protocol and existing communication protocols (also known as the external communication protocol). Hereinafter, the internal communication protocol is abbreviated to internal protocol and the external communication protocol is abbreviated to external protocol.

Normally, a charging process of electric vehicles includes four stages:

(1) Handshake stage: after completing physical connection between a BMS 61 and a charger 50,50' and power on, the BMS and the charger are in a handshake stage, and the charger confirms vehicle-related information such as vehicle identification number (VIN).

(2) Configuration stage: after the handshake stage, the BMS 61 and the charger 50,50' are in a configuration stage. In this stage, the charger sends a maximum output level to the BMS, and the BMS decides if the charger is able to charge the vehicle 60 by checking if the maximum output level satisfies charging requirements.

(3) Charging stage: after the configuration stage, the BMS 61 and the charger 50,50' are in a charging stage. The BMS sends its battery's charging level requirements (including a charging mode, and the voltage, current and power value required by the battery 62) and battery charging status (including the measured value of the charging current and voltage, maximum and minimum temperatures of the battery pack, battery state-of-charge (SOC), and remaining charging time) to the charger in real time. The charger sends its charging status (including voltage output value, current output value and accumulated charging time) to the BMS, the charger adjusts the charging current and voltage according to the charging level requirement of the battery, and both the BMS and the charger decide to stop the charging process according to their respective charging parameters or according to a stop-charging message received from the other party.

(4) End-of-charging stage: after the BMS 61 or the charger 50,50' stops the charging stage, the BMS and the charger are in an end-of-charging stage. In this stage, the BMS send to the charger the statistical data within the whole charging process.

A person of ordinary skill in the art can appreciate that the above various data transmissions do not have to follow the described four-stage mode, that they can be finished within more or less stages, and that the data transmissions included in each stage do not have to be exactly the same with the described four-stage mode, and that they can be arranged in any suitable way as long as the communication purpose is fulfilled.

To make sure the charging process is carried out smoothly, there is provided a unified internal protocol according to one embodiment of the disclosed concept, message types of the protocol being shown in Table 3.

TABLE 3

| Index | Name | Purpose of the message |
|---|---|---|
| 1 | POC | The power converter sends this message to inform the BMS of the configuration parameters related to its output capacity. Specifically, in the handshake stage, the power converter informs the data transmission device of the information; and in the charging stage, the data transmission device informs the BMS of the information. |
| 2 | CCR | In the charging stage, the BMS sends this message to the power converter, carrying the charging level request. (The battery requests optimal charging levels according to its own charging characteristic curve.) |
| 3 | PRA | In the configuration stage, after the power converter finishes all configurations, the power converter sends this message to inform the BMS that the power converter is ready for charging. |
| 4 | CSR | In the handshake stage, the BMS uses this message to send a start-of-communication request and a battery type identifier to the power converter. In the configuration stage, when ready for charging, the BMS uses this message to send a start-of-charge request to the power converter. |

TABLE 3-continued

| Index | Name | Purpose of the message |
|---|---|---|
| 5 | PEN | In the charging stage, when a charging process stops because of a fault or error of the power converter, the power converter sends this message to the BMS to inform the specific error type of the power converter. |
| 6 | CCS | In the charging stage, the charging status of the BMS is sent through this message to the power converter. |
| 7 | POS | In the charging stage, the real-time status of the power converter is sent through this message to the BMS. |
| 8 | CER | In the charging stage, the BMS uses this message to initiate an end-of-charge request to the power converter. |

It should be noted that messages of the above unified internal protocol can also be referred to as a frame, and that the message-type table (Table 3) can also be referred to as a frame-type table. In addition, messages and frames include instructions, and the above message-type table can also be referred to as an instruction table. The term 'message' will be used, without restrictive intent, in the following embodiments to describe the unified internal protocol.

According to the purposes of the above messages, data included in the messages are shown as Table 4.

TABLE 4

| Message Name | Data that can be included | | | |
|---|---|---|---|---|
| POC | maximum output voltage | maximum output current | maximum output power | |
| CCR | output voltage level request | output current level request | output power level request | output charging mode request |
| PRA | | configuration confirm | | |
| CSR | battery type | start communication | | start charging |
| CER | charging stop reason, including: battery error, power converter error, battery full, exceeds maximum charging time, etc. | | | end-of-charge request |
| PEN | | error type | | |
| POS | output voltage by power converter | output current by power converter | output power by power converter | |
| CCS | charging time | remaining charging time | estimated total charging time | battery SOC | battery temperature |

According to the purposes of the messages and the data included in the messages, the mapping relation between the unified internal protocol and external communication protocols (also referred to as external protocol) such as CHAdeMo is defined in Table 5.

TABLE 5

| | Internal Protocol | External Protocol (CHAdeMo) |
|---|---|---|
| 1 | POC | 108H |
| 2 | CCR | part of 102H |
| 3 | PRA | part of 109H |
| 4 | CSR | part of 102H |
| 5 | CER | part of 102H |
| 6 | PEN | part of 109H |
| 7 | POS | part of 109H |
| 8 | CCS | part of 109H and part of 102H |

In other embodiments of the disclosed concept, message types of the internal protocol as shown in Table 3 can be extended, and the number of types to be extended depends on the needs of users. Similarly, data in the Table 4 and mapping relations in the Table 5 (also referred to as a protocol-relation table or a protocol mapping table) can also be extended.

On one hand, the internal protocol is used between the data transmission device (e.g., 31 of FIG. 4) and the power converter 52. On the other hand, external protocols, such as CHAdeMO, are used between the data transmission device and the BMS 41. The data flow of the charging process using the above internal protocol is as follows.

Firstly, in the handshake stage: (1A) the data transmission device 31 triggers the power converter 32 (FIG. 3) to start the communication process (CSR message); (1B) the data transmission device forwards the battery type to the power converter (CSR message), and the battery type is transmitted to the data transmission device from the BMS 41 through an external protocol; and (1C) the power converter sends its output capacity to the data transmission device (POC message).

Secondly, in the configuration stage: (2A) the data transmission device 31 forwards the output capacity to the BMS 41; (2B) the data transmission device forwards a start-of-charge request (CSR message), and requests the power converter 32 to start charging; the start-of-charge request is transmitted from the BMS to the data transmission device through external protocols; and (2C) after the power converter has prepared for charging, the power converter sends a confirmation message (PRA message) to the data transmission device, and the data transmission device forwards this confirmation message to the BMS.

Thirdly, in the charging stage: (3A) the data transmission device 31 forwards the battery's charging level requirements (CCR message) and battery status (CCS message) to the power converter 32; the charging level requirements and the battery status are transmitted from the BMS 41 to the data transmission device through the external protocol; (3B) after the power converter receives the charging level requirements (CCR message) and the battery status message (CCS message), the power converter outputs power according to the required charging level (the system controller 522 controls the power module 523 to complete this function), and sends output status of the power converter 52 to the data transmission device (e.g., 31 of FIG. 4) (POS message), the output status being forwarded (through messages of the external protocol corresponding to the POS) to the BMS by the data transmission device; (3C) during the normal charging process, steps (3A) and (3B) are carried out repeatedly; and (3D) end-of-charge signals can be triggered by two independent parts: (i) after an error is occurred in the power converter, error prompts (PEN message) can be sent to the data transmission device; the data transmission device forwards the error prompts (through messages of the external protocol corresponding to the PEN) to the BMS after finishing protocol conversion; and (ii) when the BMS needs to stop charging (normal stop/fault stop), the BMS uses the external protocol to send an end-of-charge request to the data transmission device, and the data transmission device sends the end-of-charge request (CER message, including the end-of-charge request and reasons to stop) to the power converter.

Fourthly, in the end-of-charging stage: (4) the data transmission device 31 (FIG. 4) and the BMS 41 exchange their respective statistical information during the charging process (including the maximum and minimum voltages of the battery, initial and final SOC, output energy, output power, accumulated charging time, etc.), while the power converter 32 and the data transmission device can avoid exchange information.

A person of ordinary skill in the art can appreciate that various modifications can be made to the forms or the numbers of the above described instructions of the internal protocol, as long as information transmission requirements during each charging stage can be satisfied.

Figure 4:
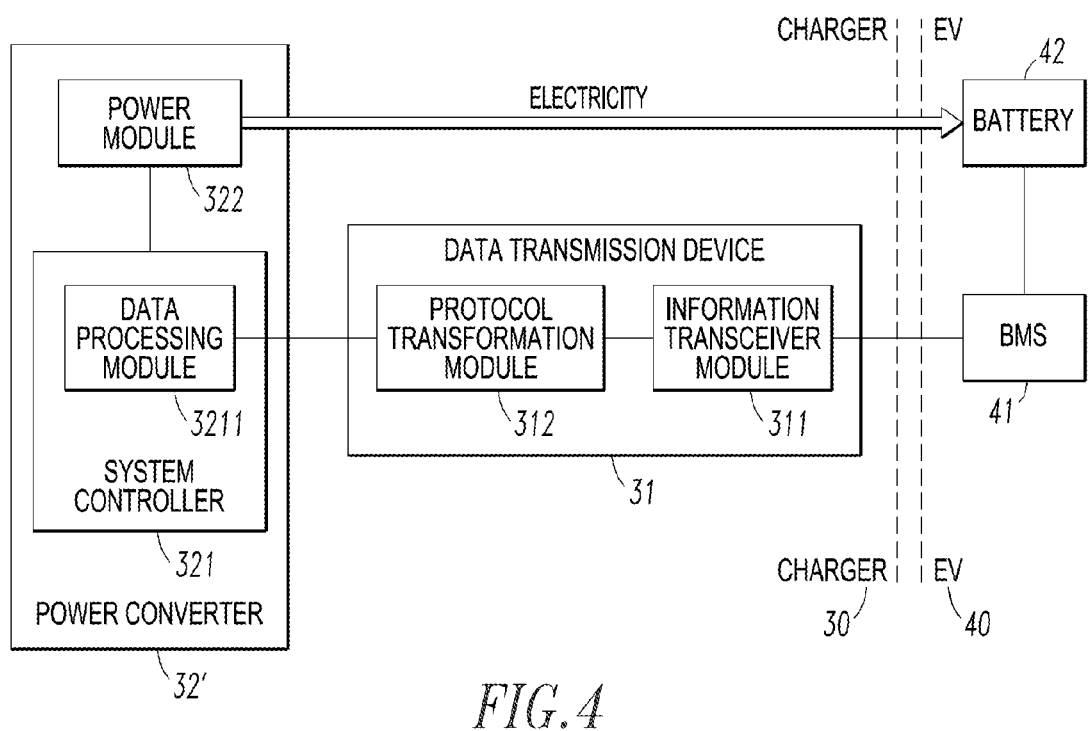

Based on above design of the internal protocol, an EV charger 30 of FIG. 4 includes the data transmission device 31, which is coupled to the BMS 41 of the electric vehicle 40 and communicates with the BMS 41 using an external protocol, and also includes the power converter 32', which communicates with the data transmission device 31 using the internal protocol, and realizes communicating with the BMS 41 and charging the battery 42 through the power module 322.

The data transmission device 31 further includes an information transceiver module 311, which is coupled to the BMS 41 of the electric vehicle 40 and communicates with the BMS 41 using an external protocol, and a protocol transformation module 312, which is adapted to transform messages, frames or instructions of various external protocols to messages, frames or instructions of the internal protocol or vice versa (i.e., to transform messages, frames or instructions of the internal protocol to messages, frames or instructions of various external protocols), and which is coupled to a power converter 32' and communicates with the power converter 32' using an internal protocol.

The power converter 32' of FIG. 4 further includes a power module 322, which is adapted to charge the battery 42, and a system controller 321, which further includes a data processing module 3211, being coupled to the protocol transformation module 312, and being adapted to analyze messages of the internal protocol and control the power module 322 to charge the battery 42 or perform other operations (such as sending requests or responses data to the BMS 41) according to instructions within the messages.

According to another embodiment of the disclosed concept, the data processing module 3211 can be omitted, the system controller 321 is coupled to the protocol transformation module 312, and the system controller 321 is adapted to analyze messages of the internal protocol and control the power module 322 to charge the battery 42 or perform other operations according to instructions within the messages.

According to another embodiment of the disclosed concept, the data transmission device 31 can further include a second information transceiver module (not shown) for communicating with the data processing module 3211 through the internal protocol.

According to another embodiment of the disclosed concept, the information transceiver module 311 can be omitted, and the protocol transformation module 312 can communicate directly with the data processing module 3211 and the BMS 41. The communication between the protocol transformation module 312 and the system controller 321 uses the internal protocol, while the communication between the protocol transformation module 312 and the BMS 41 uses an external protocol.

According to another embodiment of the disclosed concept, the protocol transformation module 312 can be omitted, and the data transmission device 31 is adapted to transform messages, frames or instructions of various external protocols to messages, frames or instructions of the internal protocol or vice versa.

According to another embodiment of the disclosed concept, the data transmission device 31 can be integrated into the power converter 32' or into the system controller 321.

Figure 5:
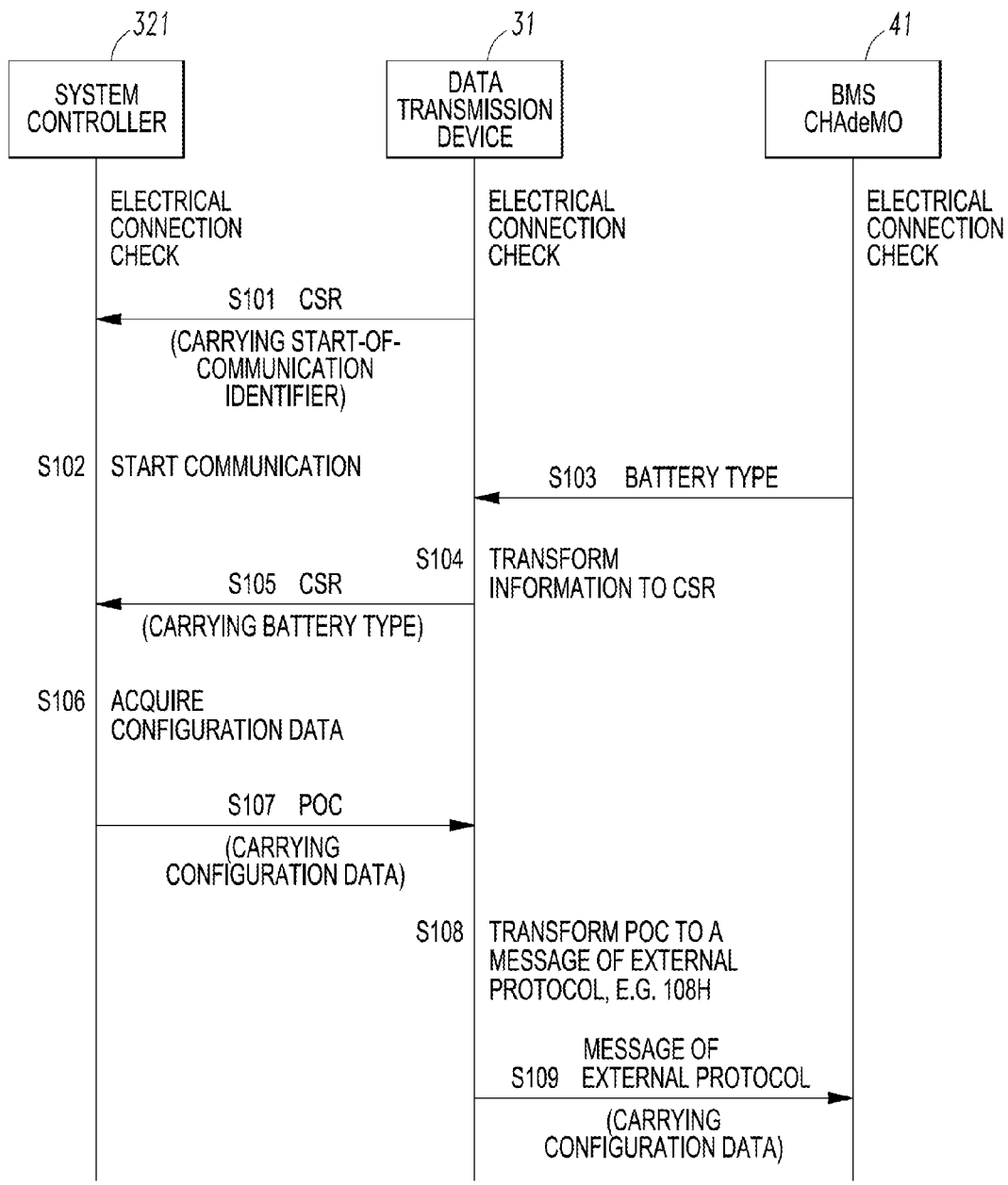
FIG. 5 is a sequence chart of an example communication process of the EV charger of FIG. 4 using an internal protocol in accordance with another embodiment of the disclosed concept.

According to one embodiment of the disclosed concept, an example process using the internal protocol to communicate by the EV charger 30 (FIG. 4) is shown in FIG. 5. This communication process shows how the electric vehicle 40 (FIG. 4) acquires the configuration parameter of "maximum output voltage" of the power converter 32' (FIG. 4). At S101, after the electric vehicle 40 plugs in and after a successful electrical connection check, the data transmission device 31 sends a CSR message to the system controller 321 of the power converter 32' (FIG. 4), which triggers the power converter to initiate a communication procedure. At S102, after receiving the CSR message, the system controller 321 initiates a communication procedure and prepares to receive messages from the data transmission device 31. At S103, the BMS 41 sends the battery type to the data transmission device 31 through the external protocol. At S104, the data transmission device 31 (or the protocol transformation module 312) converts the received message into a CSR message of the internal protocol according to the protocol-relation table (e.g., Table 5). At S105, the data transmission device 31 (or the information transceiver module 311) sends the CSR message to the system controller 321. At S106, the system controller 321 acquires the configuration data of maximum output voltage which is 600V according to instructions included in the message (the configuration data of maximum output voltage is stored within the system controller 321 when the power converter 32' is manufactured). At S107, the system controller 321 sends the configuration data of maximum output voltage which is 600V to the data transmission device 31 through the message of POC of the internal protocol. At S108, the data transmission device 31 (specifically the protocol transformation module 312 (FIG. 4)) converts the response message of POC into a message of the external protocol such as 108H of the CHAdeMo, according to the protocol-relation table. At S109, the data transmission device 31 (specifically the information transceiver module 311 (FIG. 4)) sends the message 108H to the BMS 41, which finishes the communication procedure.

According to the decision if this configuration data of 600V satisfies the requirement of the vehicle's battery 42 (FIG. 4), the BMS 41 provides to customers information of follow-up actions. If the configuration data satisfies the requirement of the battery 42, remaining steps of the configuration stage are carried out; otherwise, an error handling process is carried out, and the electric vehicle 40 informs customers that the battery 42 cannot be charged and its reasons.

Figure 6:
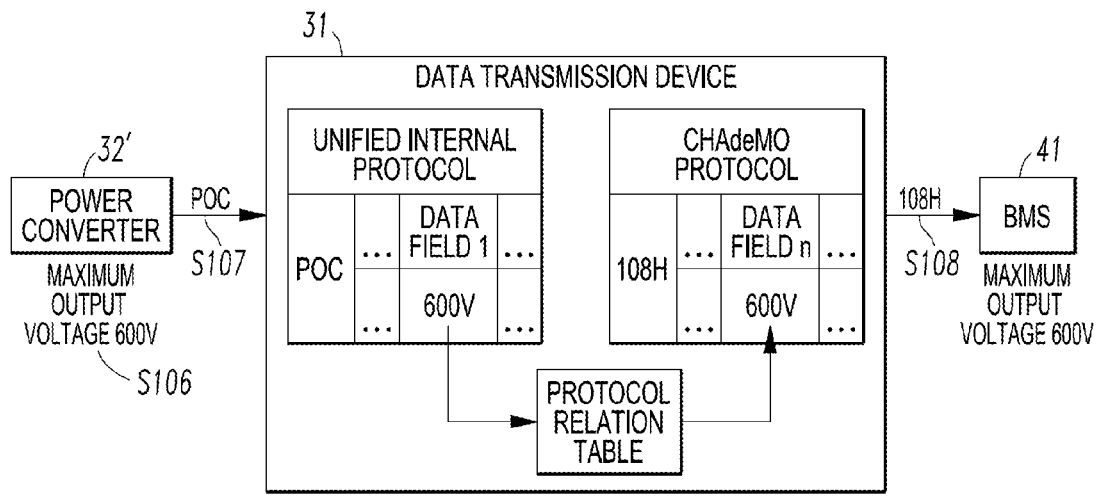
FIG. 6 is a block diagram in schematic form of a protocol transformation or protocol mapping in the sequence chart of FIG. 5 as performed by a data transmission device.

In addition, the above steps S106, S107 and S108 are also illustrated in FIG. 6, which highlights the protocol transformation or mapping process carried out by the data transmission device 31 (or the protocol transformation module 312 (FIG. 4)).

Figure 7:
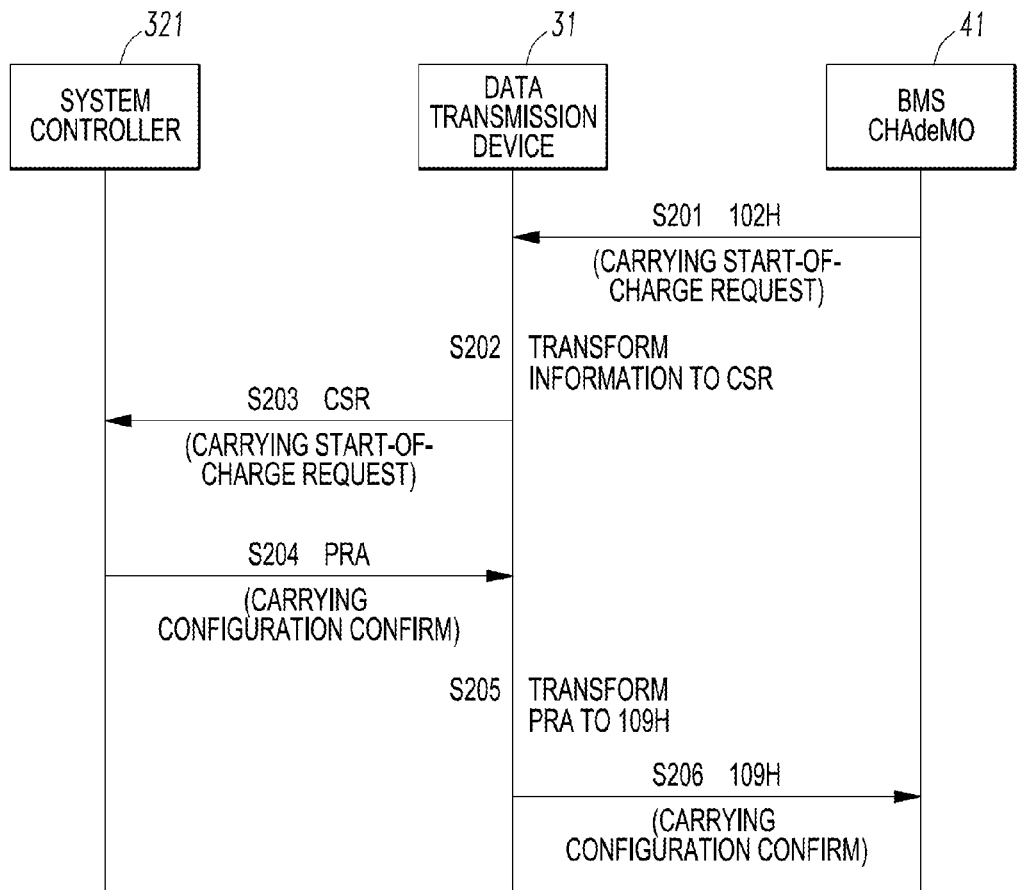
FIGS. 7-10 are sequence charts of example communication processes of the EV charger of FIG. 4 using an internal protocol in accordance with embodiments of the disclosed concept.

According to another embodiment of the disclosed concept, another example process using the internal protocol to communicate by the EV charger 30 (FIG. 4) is shown in FIG. 7. This communication process illustrates how an electric vehicle 40 (FIG. 4) which follows CHAdeMo protocol exchanges data with the power converter 32' (FIG. 4) in the configuration stage. At S201, the BMS 41 sends the start-of-charge request to the data transmission device 31 through a message of the CHAdeMo protocol (102H, DB4; i.e., the fourth byte). At S202, the data transmission device 31 (specifically the protocol transformation module 312 (FIG. 4)) converts this message into the CSR message of the internal protocol according to the protocol-relationship table (Table 5). At S203, the data transmission device 31 sends the CSR message (which carries the start-of-charge request) to the system controller 321 to request the power converter 32' to start charging. At S204, after it has prepared for charging, the power converter 32' sends a PRA message to the data transmission device 31; (if the power converter 32' has not prepared for charging, the BMS 41 waits and repeats a plurality of times until receiving a timeout error). At S205, the data transmission device 31 transforms the PRA message into 109H (DB6). At S206, the data transmission device 31 sends this message to the BMS 41.

After the data communication in the configuration stage is done, the charging stage begins. The BMS 41 calculates the optimal current value according to the battery status and sends current instructions, monitors input current, and sends error signals when faults occur.

Figure 8:
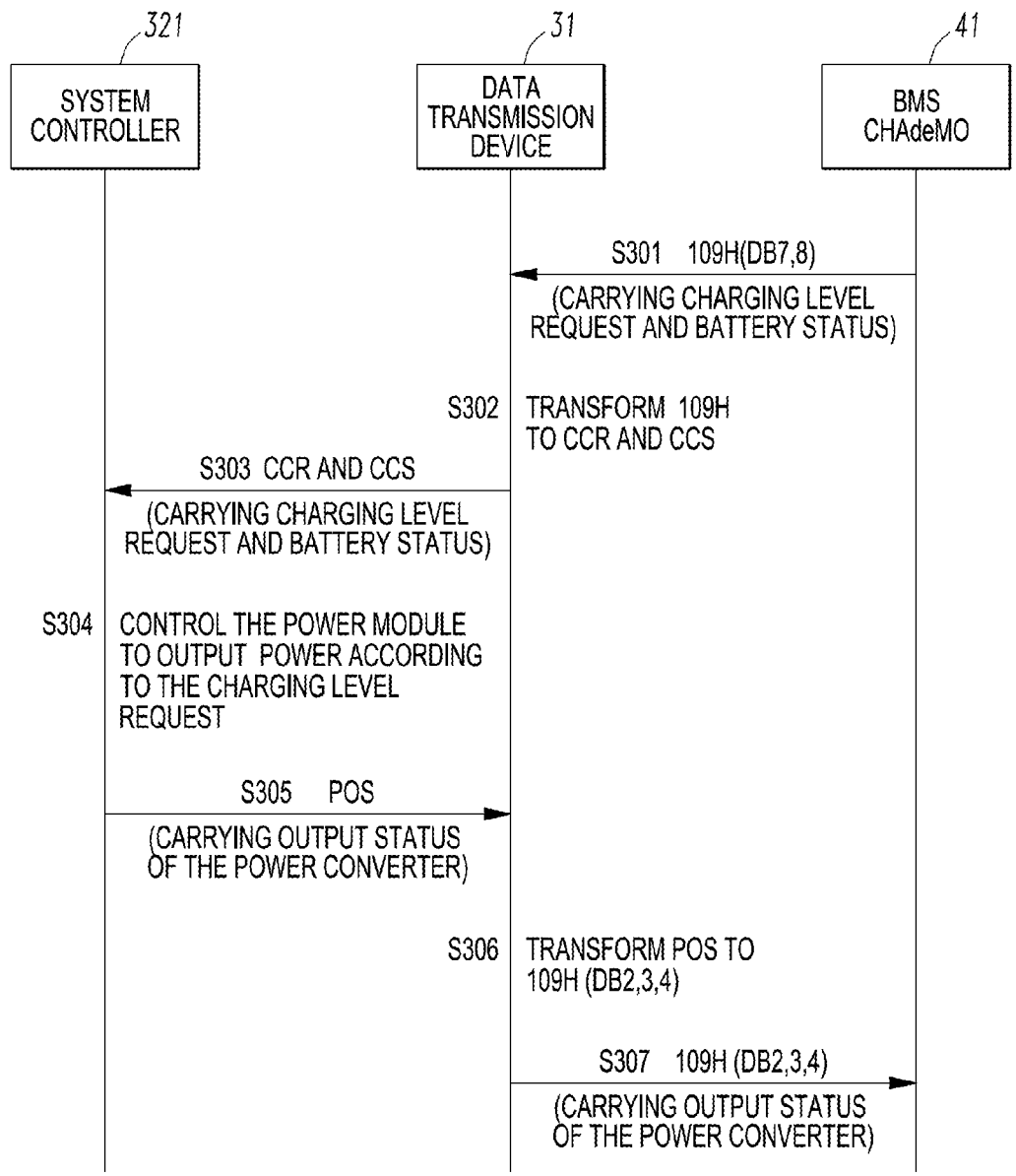

According to another embodiment of the disclosed concept, another example process using the internal protocol to communicate by the EV charger 30 (FIG. 4) is shown in FIG. 8. This communication process illustrates how an electric vehicle 40 (FIG. 4) which follows CHAdeMo protocol exchanges data with the power converter 32' (FIG. 4) in the charging stage. At S301, the BMS 41 sends a charging level requirement and battery status to the data transmission device 31, the charging level requirement is in 102H (DB2, 3, 4) (not shown), and the battery status is in 109H (DB7, 8). At S302, the data transmission device 31 (specifically the protocol transformation module 312 (FIG. 4)) converts this message into the CCR and CCS message of the internal protocol, according to the protocol-relation table (Table 5). At S303, the data transmission device 31 sends the CCR and CCS (which carry the charging level requirement and the battery status) to the system controller 321. At S304, after receiving the charging level requirement and the battery status information, the system controller 321 outputs power (the system controller 321 controls the power module 322 (FIG. 4) to carry out this function) according to the charging level requirement. At S305, the system controller 321 sends the output status of the power converter 32' (FIG. 4) to the data transmission device 31 (through the POS message). At S306, the data transmission device 31 (specifically the protocol transformation module 312 (FIG. 4)) converts the POS message into 109H (DB2, 3, 4), according to the protocol-relation table. At S307, the data transmission device 31 sends this message to the BMS 41.

This communication of charging stage realizes information exchange during the charging stage. During this stage, the EV charger 30 (FIG. 4) controls the charging output voltage, and monitors charging abnormal conditions periodically. The BMS 41 calculates optimal current value according to the battery status and sends current instructions, monitors input current, and sends error signals when faults occur.

There are two ways to trigger the end-of-charge signal, including a first way that an error of the power converter 32' (FIG. 4) triggers this signal, and a second way that the BMS 41 triggers this signal when it needs to stop charging (normal stop/fault stop).

Figure 9:
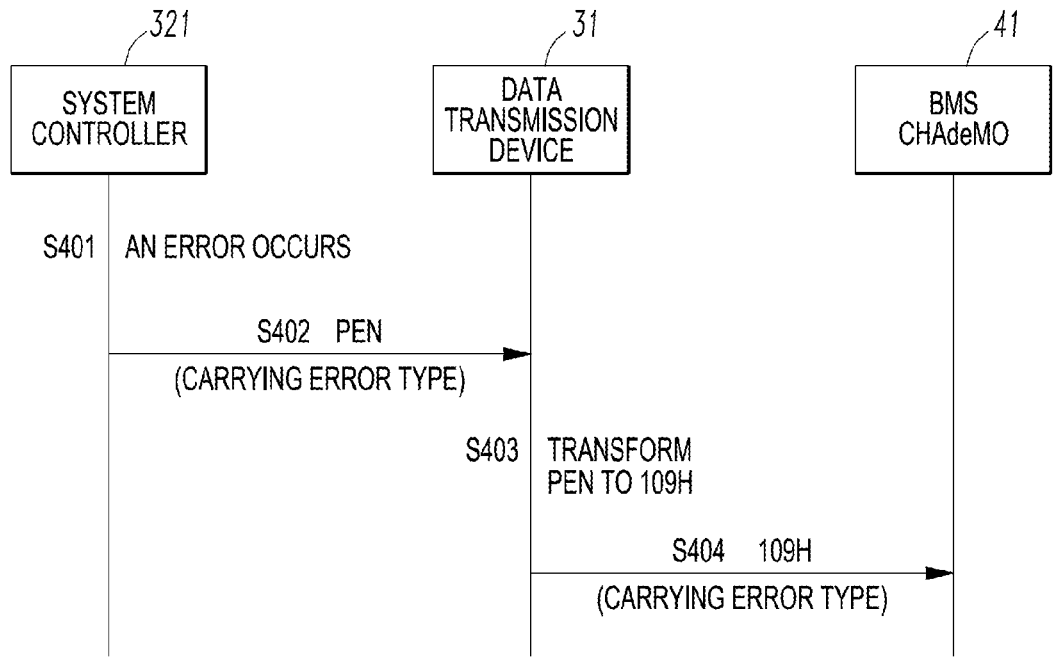

According to another embodiment of the disclosed concept, according to the above first way, an example process using the internal protocol to communicate by the EV charger 30 (FIG. 4) is shown in FIG. 9. This communication process illustrates how an electric vehicle 40 (FIG. 4) which follows CHAdeMo protocol exchanges data with the power converter 32' (FIG. 4) to stop the charging process. At S401, the system controller 321 detects a fault or error at the power converter 32'. At S402, the system controller 321 sends the error type information to the data transmission device 31 (through PEN message). At S403, the data transmission device 31 transforms the PEN message (carrying the error type) to the corresponding 109H (DB6). At S404, the data transmission device 31 sends the message to the BMS 41.

Figure 10:
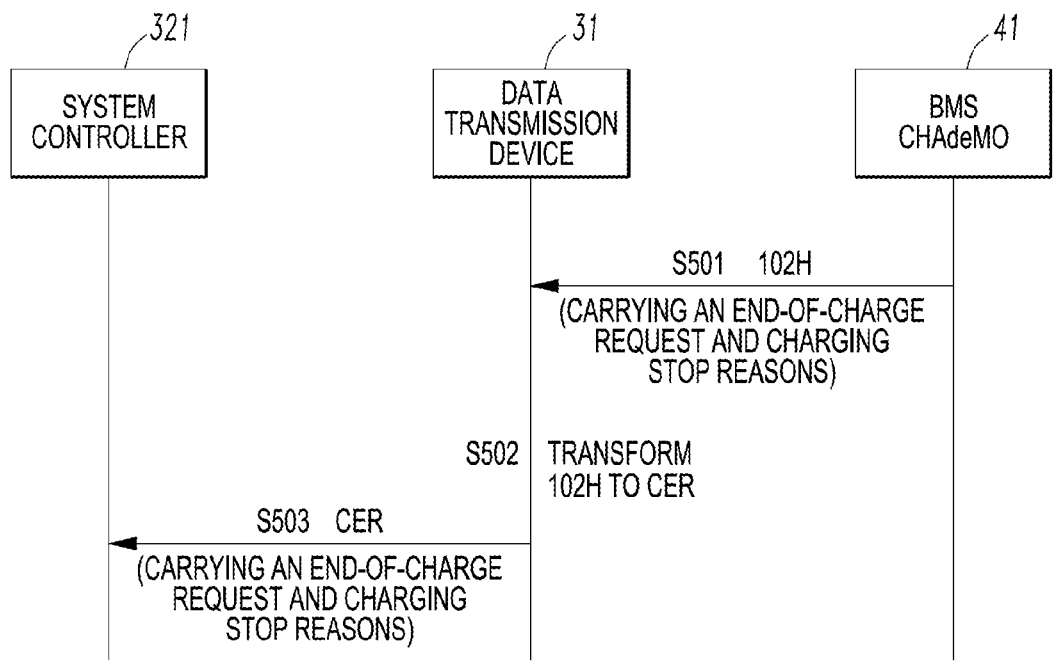

According to another embodiment of the disclosed concept, according to the above second way, an example process using the internal protocol to communicate by the EV charger 30 (FIG. 4) is shown in FIG. 10. This communication process illustrates how an electric vehicle 40 (FIG. 4) which follows CHAdeMo protocol exchanges data with the power converter 32' (FIG. 4) to stop the charging process. At S501, the BMS 41 sends an end-of-charge request through 102H (DB5, 6) to the data transmission device 31. At S502, the data transmission device 31 transforms this 102H (carrying the end-of-charge request and charging stop reasons) to the corresponding CER message. At S503, the data transmission device 31 sends the CER message (carrying the end-of-charge request and charging stop reasons) to the power converter 32' (specifically the system controller 321).

The data transmission device 31 does not forward all messages from the BMS 41 to the power converter 32' (FIG. 4). The data transmission device 31 possesses certain data processing ability, and only forwards necessary filtered messages to the power converter 32'.

For example, the data transmission device 31 calculates the charging time, and sends the result to the power converter 32' and the BMS 41 simultaneously, while the total charging time is processed in a similar way. For another example, the data transmission device 31 can process the end-of-charge request from the BMS 41, keep the charging stop reasons, and only send an end-of-charge order to the power converter 32'.

A person of ordinary skill in the art can appreciate that the above embodiments using CHAdeMo as external protocols are provided purely by way of example and without restrictive intent.

Figure 11:
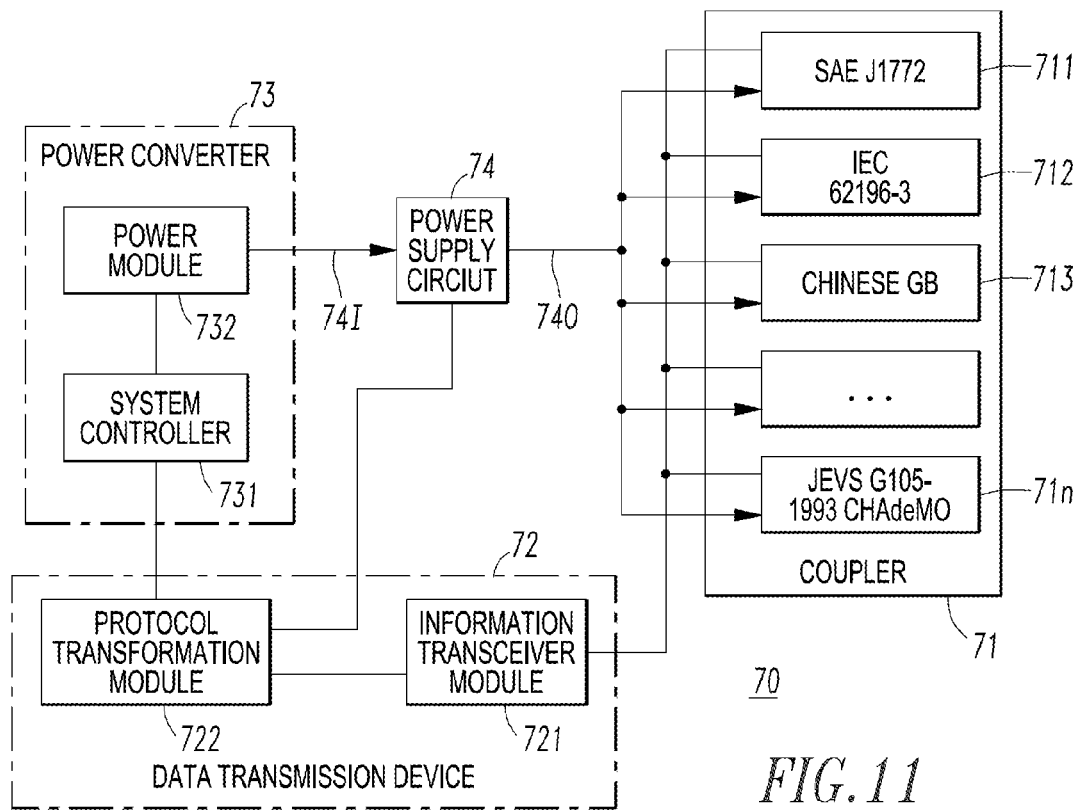
FIGS. 11 and 12 are block diagrams in schematic form of multi-standard compatible EV chargers in accordance with other embodiments of the disclosed concept.

A person of ordinary skill in the art can also appreciate that embodiments shown in FIGS. 2, 3 and 4 can be combined as required. For example, FIG. 11 illustrates an embodiment based on the combination of embodiments shown in FIGS. 2 and 4. An EV charger 70 includes a coupler 71, a data transmission device 72, a power converter 73 and a power supply circuit 74, which are coupled in sequence. The coupler 71 is adapted to be coupled to a coupler of an electric vehicle (not shown, but see the EV 60 of FIGS. 2 and 3, and the EV 40 of FIG. 4) to perform power and data transmission. The coupler 71 further includes, for example and without limitation, a coupler 711 of SAE J1772, a coupler 712 of IEC 62196-3, a coupler 713 of Chinese GB, and a coupler 71n of CHAdeMO (which are collectively referred to as coupler 71).

The data transmission device 72 includes an information transceiver module 721 and a protocol transformation module 722. The information transceiver module 721 is coupled to the coupler 71 to perform data transmission, the protocol of the data transmission being an external protocol of the coupler 71. The protocol transformation module 722 is coupled to the power supply circuit 74 and the information transceiver module 721 respectively, to perform data transmission including: on one hand, acquiring a selection signal or an indication message from the power supply circuit 74 to get the type of the external protocol of the electric vehicle connected with the charger 70; and on the other hand, the information transceiver module 721 and the coupler 71 communicate with each other according to the external protocol. The protocol transformation module 722 is adapted mainly to perform protocol conversion according to the selection signal, which is the same as protocol conversion carried out by the protocol transformation module 312 as shown in FIG. 4. The protocol transformation module 722 is further coupled to the power converter 73 to communicate with the power converter 73 under the internal protocol.

A person of ordinary skill in the art can appreciate that the protocol transformation module 722 can also perform message mapping and conversion according to the mapping table (Table 5), while the selection signal used in this embodiment, instead of message mapping, improves efficiency.

The power converter 73 further includes a system controller 731 and a power module 732, and the system controller 731 has an interface, which is compatible with the internal protocol, to receive messages or instructions of the internal protocol to configure the power module 732 to output power. Specifically, the system controller 731 which is coupled to the protocol transformation module 722 communicates with the protocol transformation module 722 with the internal protocol, and controls the charging process together with the BMS (not shown, but see BMS 61 of FIGS. 2 and 3, and BMS 41 of FIG. 4) of the electric vehicle (not shown, but see EV 60 of FIGS. 2 and 3, and EV 40 of FIG. 4), according to the communication. The power module 732, which is coupled to the power supply circuit 74 on power line 741, provides electric power to the electric vehicle through the power supply circuit 74 on power line 740. Otherwise, FIG. 11 shows signal lines.

The power supply circuit 74 is coupled to the coupler 71 to transmit electric power to the electric vehicle through the coupler 71. The power supply circuit 74 is coupled to the protocol transformation module 722 and sends the selection signal to the protocol transformation module 722. In particular, after the coupler 71 is electrically connected to an electric vehicle, the power supply circuit 74 is able to determine which coupler within the coupler 71 is now being used for connection. Then, the power supply circuit 74 determines the type of external protocol to be CHAdeMO according to the specific coupler such as the coupler 71*n*, and sends this protocol type to the protocol transformation module 722.

Take the type of communication protocol of an electric vehicle being CHAdeMO for example, the charging process from the EV charger 70 to the electric vehicle includes: (1) the electrical connection between the coupler 71*n* and a coupler of the electric vehicle is completed; (2) the power supply circuit 74 sends an indication message or a selection signal, which contains the type "CHAdeMO" of the external protocol, to the protocol transformation module 722; and (3) the system controller 731, the protocol transformation module 722, and the BMS of the electric vehicle perform communications of the handshaking stage, the configuration stage and the charging stage. After that, the system controller 731 and the BMS control the charging process until the end.

Figure 12:
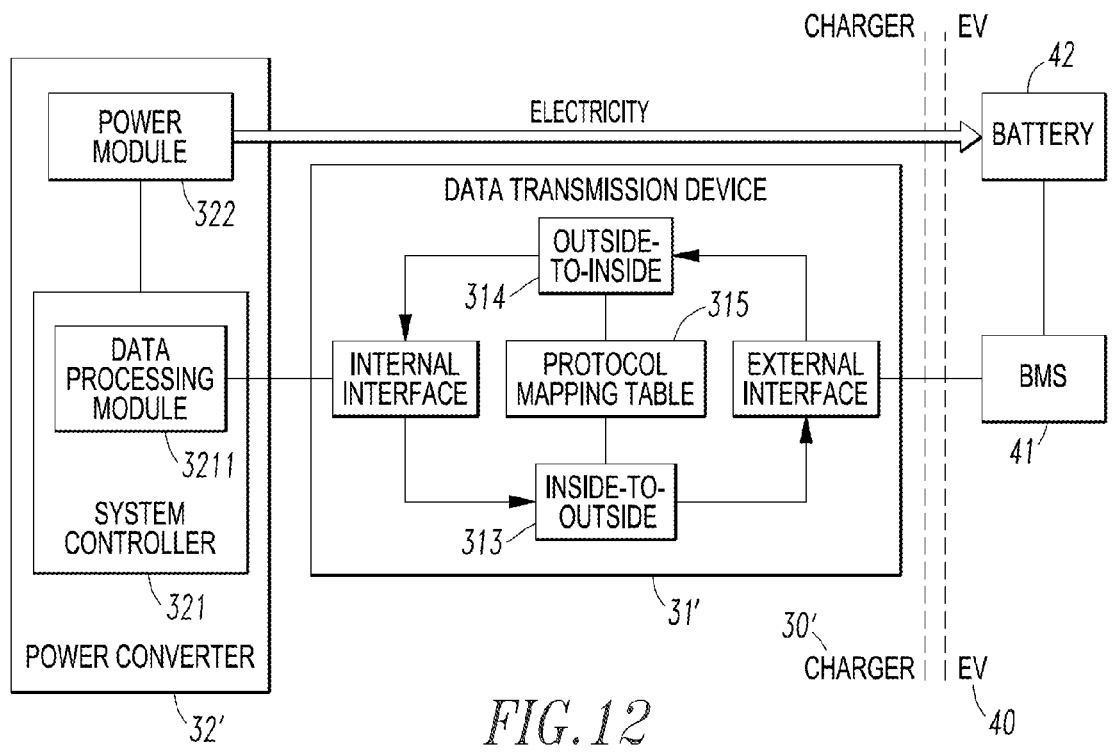

Furthermore, according to another embodiment of the disclosed concept, there is provided an EV charger 30' as shown in FIG. 12. The difference between the EV chargers 30 and 30' of respective FIGS. 4 and 12 is the structure of the respective data transmission devices 31 and 31'. As shown in FIG. 12, the data transmission device 31' includes an outside-to-inside transformation module 314, which is adapted to receive messages or data from electric vehicles, transform the messages or data to corresponding messages or data of the internal protocol, and transmit the transformation result to the power converter 32'. The data transmission device 31' also includes an inside-to-outside transformation module 313, which is adapted to receive messages or data from the power converter 32', to transform the messages or data to corresponding messages or data of external protocols (to-be-charged vehicles follows the external protocols), and to send the transform result to the electric vehicle 40. The data transmission device 31' can also include a protocol mapping table 315 which includes mapping relations between the internal protocol and external protocols as shown in Table 5. The protocol mapping table 315 is coupled to the outside-to-inside transformation module 314 and the inside-to-outside transformation module 313 respectively, providing mapping relation information between protocols to the outside-to-inside transformation module 314 and the inside-to-outside transformation module 313.

Figure 13:
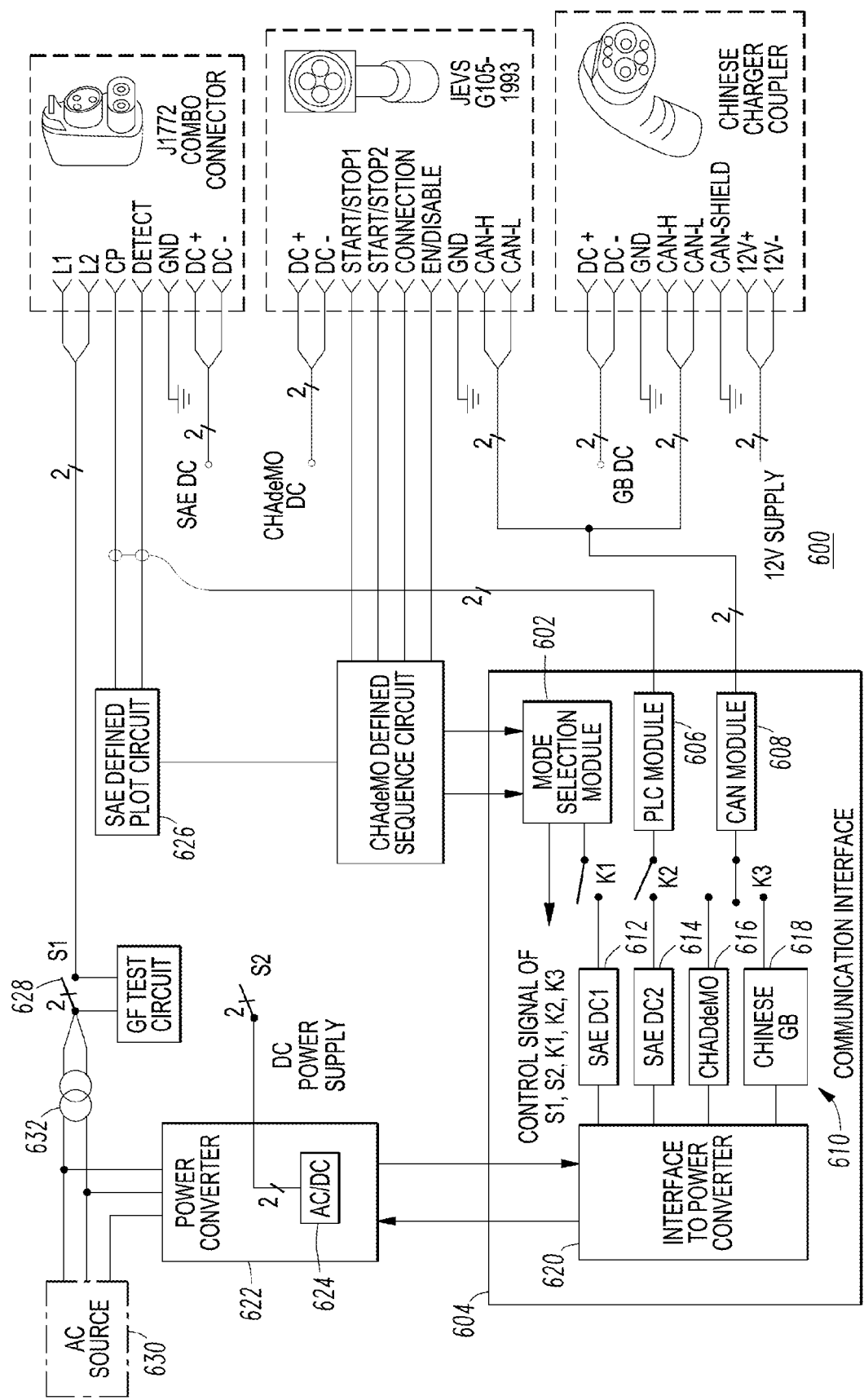
FIG. 13 is a block diagram of an alternating current and direct current compatible electric vehicle supply equipment (EVSE) in accordance with embodiments of the disclosed concept.

Furthermore, according to another embodiment of the disclosed concept, there is provided an AC and DC compatible EV charger 600 (or EVSE 600) as shown in FIG. 13. This shows a detailed pin definition according to different protocols and a charging mode selection module 602. The communication interface 604 includes the following components which perform their respective functions: (1) the mode selection module 602 to select different charging modes by sensing connectivity and choosing appropriate switch positions; (2) a power line carrier (PLC) module 606 and a controller area network (CAN) bus module 608 to communicate with the EV (not shown, but see EV 60 of FIGS. 2 and 3, and EV 40 of FIG. 4), using a specified physical link; and (3) a protocol interpretation and mapping component 610, including SAE DC L1 612, SAE DC L2 614, CHAdeMO 616, the Chinese GB 618, and a communication interface 620 to the power converter 622 to map different protocols to a universal interface communicating with a unified internal protocol to an AC-DC power converter 624.

For convenience of illustration in FIGS. 13-17, power or signal electrical connections, switches or outputs (e.g., S1, S2, L1/L2, CP and Detect pins, DC+/DC−, CAN-H/CAN-L, 12V+/12V−, single-phase AC power 634, DC power supply 640, and outputs 648,656,666) employing two conductors are generally shown with a "/" and a "2" to indicate that count of conductors.

FIGS. 14-17 show four different charging modes, including SAE AC, SAE DC L1, SAE DC L2 and CHAdeMO, respectively. These provide a different configuration between AC and DC. Since the Chinese GB 618 employs the same physical communication medium, CAN bus, as does CHAdeMO 616, the illustration of the Chinese GB is not included, but is discussed, below, in connection with FIG. 17.

Figure 14:
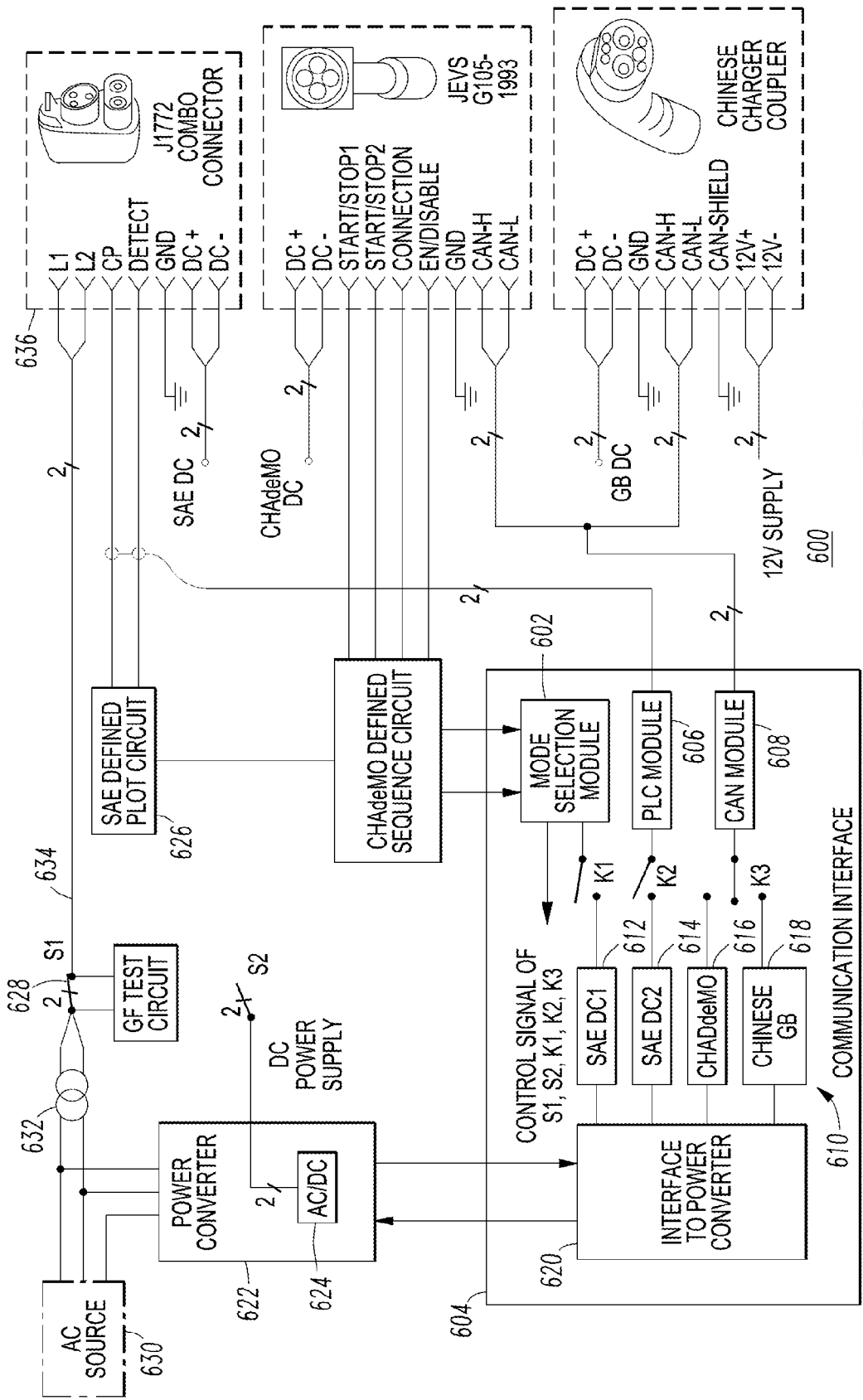
FIG. 14 is a block diagram of the SAE AC charging mode in accordance with an embodiment of the disclosed concept.

As shown in FIG. 14, when an EV (not shown, but see EV 60 of FIGS. 2 and 3, and EV 40 of FIG. 4) with the SAE AC charging mode is connected to the EVSE 600, the EV generates a signal on the pilot circuit 626 that senses the connectivity and informs the mode selection module 602. Switch S1 628 is closed by the mode selection module 602. Relatively high three-phase AC power from AC source 630 (shown in phantom line drawing) is converted into relatively low single-phase AC power by a transformer 632, although any suitable source of AC power can be employed. Then, the single-phase AC power 634 from the transformer 632 is provided to the EV through L1 and L2 of the J1772 combo connector 636.

Figure 15:
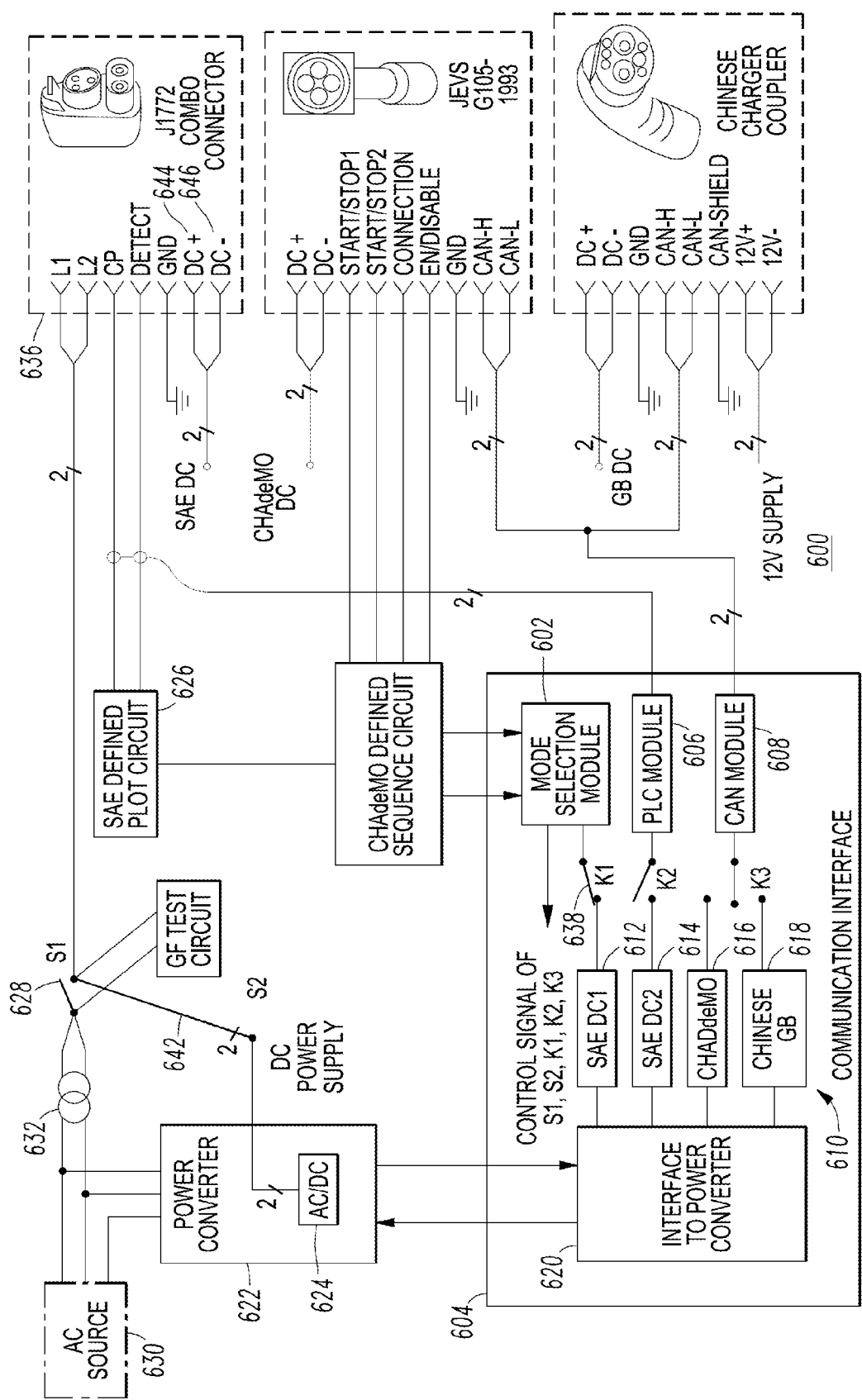
FIG. 15 is a block diagram of the SAE DC L1 charging mode in accordance with an embodiment of the disclosed concept.

Referring to FIG. 15, when an EV (not shown, but see EV 60 of FIGS. 2 and 3, and EV 40 of FIG. 4) with the SAE DC L1 charging mode is connected to the EVSE 600, the signal generated by the EV on the pilot circuit 626 senses the connectivity and determines the SAE DC L1 charging mode. Switch K1 638 is electrically connected to the SAE DC L1 module 612, in order to adjust the DC output 640 of the power converter 622 according to the SAE DC L1 specification. Switch S2 642 is electrically connected to L1 and L2 of the J1772 combo connector 636 to output DC power.

Figure 16:
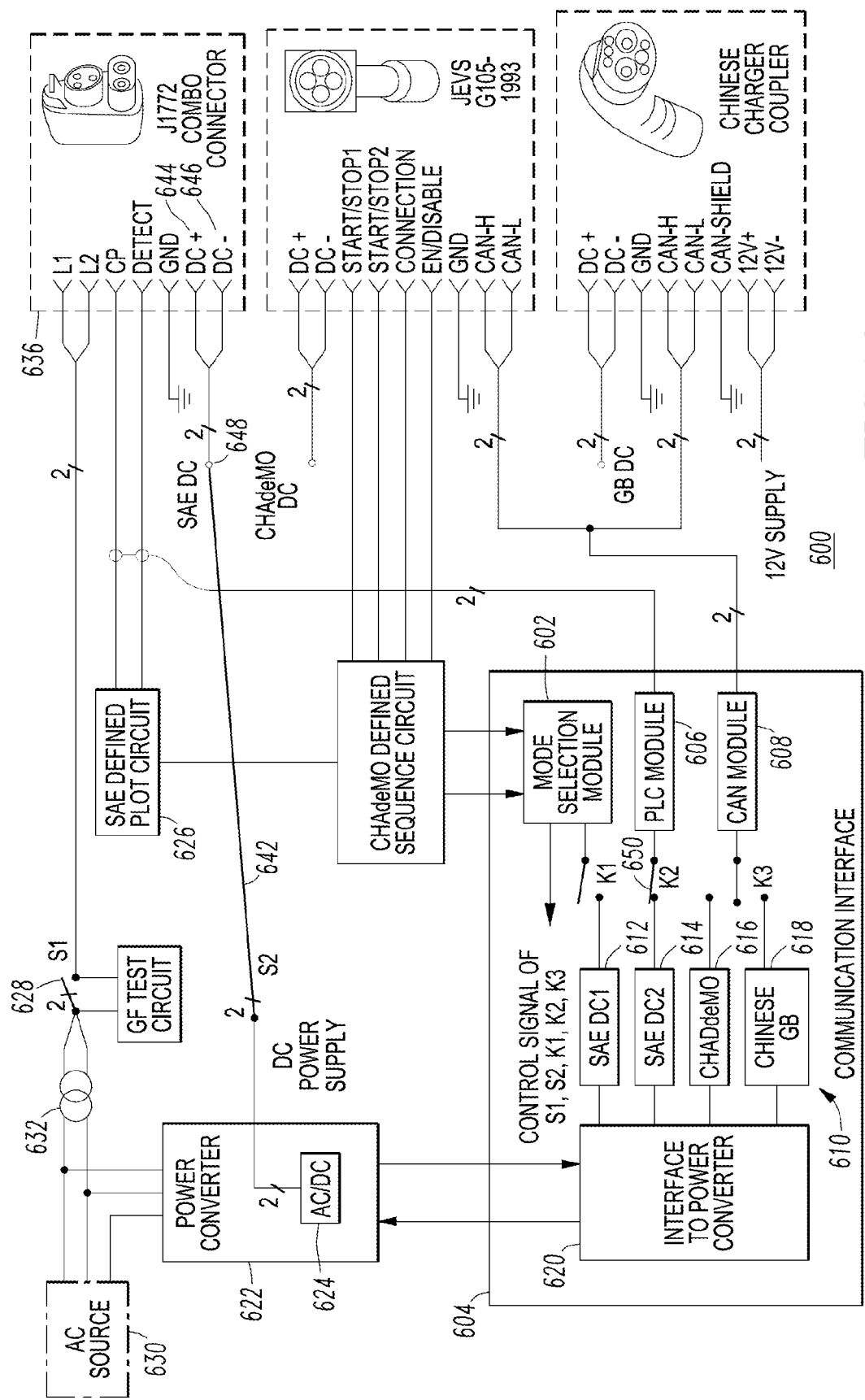
FIG. 16 is a block diagram of the SAE DC L2 charging mode in accordance with an embodiment of the disclosed concept.

As shown in FIG. 16, for SAE DC L2, a DC+ pin 644 and a DC− pin 646 are added in the J1772 combo connector 636 as the DC power channel. In this case, the PLC module 606 obtains the information from the CP and Detect pins of combo connector 636, indicating that the SAE DC L2 mode is applied. Switch S1 628 is disconnected, and switch S2 642 is electrically connected to the SAE DC output 648 between the power converter 622 and the DC+ pin 644 and the DC− pin 646, and the PLC module 606 is enabled to communicate with the EV by switch K2 650. The SAE DC2 module 614 functions as the protocol implementation in communication interface 604. The DC output 640 of the power converter AC/DC 624 is adjusted accordingly.

Figure 17:
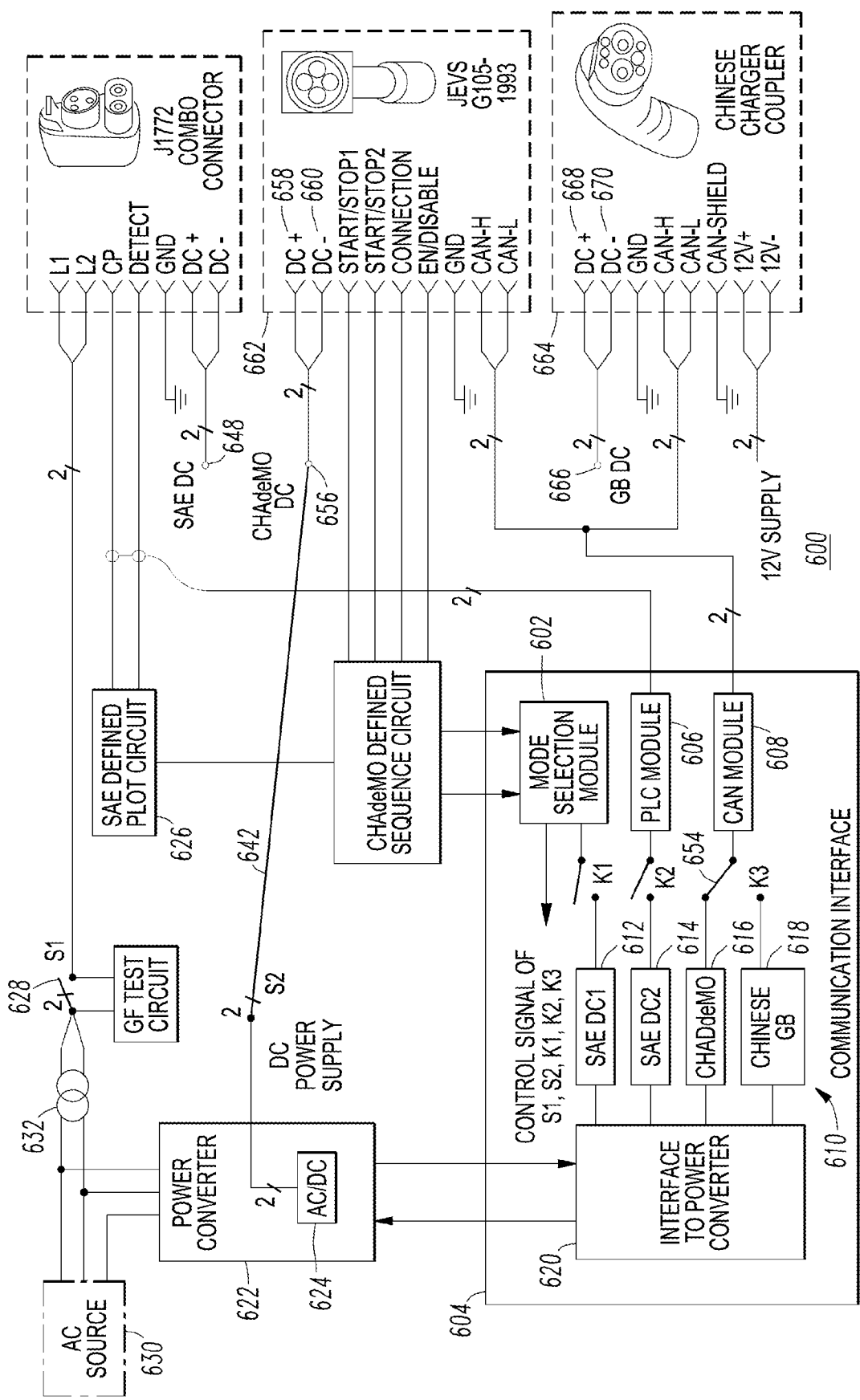
FIG. 17 is a block diagram of the SAE CHAdeMO charging mode in accordance with an embodiment of the disclosed concept.

Referring to FIG. 17, the CHAdeMO defined sequence circuit 652 judges the connectivity of the CHAdeMO EV (not shown, but see EV 60 of FIGS. 2 and 3, and EV 40 of FIG. 4), and provides the corresponding indication to the mode selection module 602. The CAN bus module 608 is enabled to perform the communication between the EV and the interface to the power converter 620, and switch K3 654 is electrically connected to the CHAdeMO component 616 for protocol mapping. Switch S2 642 is electrically connected to the CHAdeMO DC output 656 and the DC+ pin 658 and the DC− pin 660 of the CHAdeMO connector 662.

Since the Chinese GB 618 employs the same physical communication medium, CAN bus via the CAN bus module 608, as does CHAdeMO 616, operation of the Chinese GB charging mode for the Chinese GB connector 664 operates in the same manner as was described for the CHAdeMO connector 662, except that the switch S2 642 is electrically connected between the DC output 640 of the power converter AC/DC 624 and GB DC output 666 and the DC+ pin 668 and the DC− pin 670 of the Chinese GB connector 664, and the switch K3 654 is electrically connected between the CAN bus module 608 and the GB component 618 for protocol mapping.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A multi-standard compatible electric vehicle supply equipment comprising:
    a plurality of different electric vehicle connectors each of which corresponds to one of a plurality of different electric vehicle standards;
    a power converter structured to input alternating current power and including an output structured to output direct current power;
    a first switch structured to selectively electrically connect a source of alternating current power to a number of said different electric vehicle connectors;
    a second switch structured to selectively electrically connect the output of said power converter to a selected one of said different electric vehicle connectors;
    a protocol interpretation and mapping component structured to employ a plurality of different communication protocols for said different electric vehicle connectors;
    an interface between said protocol interpretation and mapping component and said power converter;
    a first circuit structured to detect connectivity of one of said different electric vehicle connectors with an electric vehicle and responsively select one of a plurality of different charging modes, and to control said first switch, said second switch and a plurality of third switches;
    a second circuit structured to communicate with said electric vehicle through said selected one of said different electric vehicle connectors; and
    said plurality of third switches structured to electrically connect said protocol interpretation and mapping component to one of said first and second circuits.

2. The multi-standard compatible electric vehicle supply equipment of claim 1 wherein said different electric vehicle connectors include a plurality of different electric vehicle connectors having a direct current output and a number of electric vehicle connectors having either a direct current output or an alternating current output.

3. The multi-standard compatible electric vehicle supply equipment of claim 1 wherein said different communication protocols include CHAdeMO and power line carrier.

4. The multi-standard compatible electric vehicle supply equipment of claim 1 wherein a number of said different electric vehicle connectors are structured to charge said electric vehicle with an alternating current output powered through said first switch.

5. The multi-standard compatible electric vehicle supply equipment of claim 1 wherein a plurality of said different electric vehicle connectors are structured to charge said electric vehicle with a direct current output powered through said second switch.

6. The multi-standard compatible electric vehicle supply equipment of claim 1 wherein a number of said different electric vehicle connectors are structured to charge said electric vehicle with either a direct current output powered through said second switch or an alternating current output powered through said first switch.

7. The multi-standard compatible electric vehicle supply equipment of claim 1 wherein said second circuit comprises a power line carrier module and a controller area network bus module structured to communicate with said electric vehicle through said selected one of said different electric vehicle connectors.

8. The multi-standard compatible electric vehicle supply equipment of claim 1 wherein said first circuit comprises a pilot circuit structured to detect connectivity of said one of said different electric vehicle connectors with said electric vehicle; and wherein said first circuit is further structured to cause said first switch to open, cause said second switch to electrically connect the output of said power converter to said selected one of said different electric vehicle connectors to provide direct current power thereto, and cause one of said third switches to electrically connect said protocol interpretation and mapping component to said first circuit to adjust said provided direct current power.

9. The multi-standard compatible electric vehicle supply equipment of claim 1 wherein said second circuit comprises a power line carrier module structured to communicate with said electric vehicle through said selected one of said different electric vehicle connectors; wherein said first circuit comprises a pilot circuit structured to detect connectivity of said one of said different electric vehicle connectors with said electric vehicle; and wherein said first circuit is further structured to cause said first switch to open, cause said second switch to electrically connect the output of said power converter to said selected one of said different electric vehicle connectors to provide direct current power thereto, and cause one of said third switches to electrically connect said protocol interpretation and mapping component to said second circuit to adjust said provided direct current power.

10. The multi-standard compatible electric vehicle supply equipment of claim 1 wherein said first circuit comprises a CHAdeMO defined sequence circuit structured to detect connectivity of said one of said different electric vehicle connectors with said electric vehicle; wherein said first circuit is further structured to cause said first switch to open, and cause said second switch to electrically connect the output of said power converter to said selected one of said different electric vehicle connectors to provide direct current power thereto; wherein said second circuit comprises a controller area network bus module structured to communicate with said electric vehicle through said selected one of said different electric vehicle connectors; wherein said protocol interpretation and mapping component comprises a CHAdeMO mapping circuit; and wherein said first circuit is further structured to cause one of said third switches to electrically connect said CHAdeMO mapping circuit to said controller area network bus module for protocol mapping.

11. The multi-standard compatible electric vehicle supply equipment of claim 1 wherein said first circuit comprises a CHAdeMO defined sequence circuit structured to detect connectivity of said one of said different electric vehicle connectors with said electric vehicle; wherein said first circuit is further structured to cause said first switch to open, and cause said second switch to electrically connect the output of said power converter to said selected one of said different electric vehicle connectors to provide direct current power thereto; wherein said second circuit comprises a controller area network bus module structured to communicate with said electric vehicle through said selected one of said different electric vehicle connectors; wherein said protocol interpretation and mapping component comprises a Chinese GB mapping circuit; and wherein said first circuit is further structured to cause one of said third switches to electrically connect said Chinese GB mapping circuit to said controller area network bus module for protocol mapping.

12. The multi-standard compatible electric vehicle supply equipment of claim 1 wherein said first circuit comprises a pilot circuit structured to detect connectivity of said one of said different electric vehicle connectors with said electric vehicle; wherein said first circuit responsively causes said first switch to close, causes said second switch to open, and causes said third switches to open; and wherein said first switch electrically connects alternating current power to said one of said different electric vehicle connectors.

13. The multi-standard compatible electric vehicle supply equipment of claim 1 wherein said power converter comprises an alternating current to direct current power converter having a direct current output; wherein said second switch is structured to selectively electrically connect said direct current output to said selected one of said different electric vehicle connectors; and wherein said interface between said protocol interpretation and mapping component and said power converter communicates with a unified internal protocol to said alternating current to direct current power converter.

14. A multi-standard compatible electric vehicle supply equipment comprising:
 a plurality of different electric vehicle connectors each of which corresponds to one of a plurality of different electric vehicle standards;
 a power converter structured to input alternating current power and including an output structured to output direct current power; and
 a circuit structured to selectively electrically connect a source of alternating current power to a number of said electric vehicle connectors, selectively electrically connect the output of said power converter to a selected one of said different electric vehicle connectors, employ a plurality of different communication protocols for said different electric vehicle connectors, detect connectivity of one of said different electric vehicle connectors with an electric vehicle and responsively select one of a plurality of different charging modes, and communicate with said electric vehicle through said selected one of said different electric vehicle connectors.

15. The multi-standard compatible electric vehicle supply equipment of claim 14 wherein said different electric vehicle connectors include a plurality of different electric vehicle connectors having a direct current output and a number of electric vehicle connectors having either a direct current output or an alternating current output.

16. The multi-standard compatible electric vehicle supply equipment of claim 14 wherein said circuit comprises a power line carrier module structured to communicate with said electric vehicle through said selected one of said different electric vehicle connectors, and a pilot circuit structured to detect connectivity of said one of said different electric vehicle connectors with said electric vehicle; and wherein said circuit is further structured to electrically connect the output of said power converter to said selected one of said different electric vehicle connectors to provide direct current power thereto.

17. The multi-standard compatible electric vehicle supply equipment of claim 14 wherein said circuit comprises a CHAdeMO defined sequence circuit structured to detect connectivity of said one of said different electric vehicle connectors with said electric vehicle, a controller area network bus module structured to communicate with said electric vehicle through said selected one of said different electric vehicle connectors, and a CHAdeMO mapping circuit electrically connected to said controller area network bus module for protocol mapping; and wherein said circuit is further structured to electrically connect the output of said power converter to said selected one of said different electric vehicle connectors to provide direct current power thereto.

18. The multi-standard compatible electric vehicle supply equipment of claim 14 wherein said circuit comprises a CHAdeMO defined sequence circuit structured to detect connectivity of said one of said different electric vehicle connectors with said electric vehicle, a controller area network bus module structured to communicate with said electric vehicle through said selected one of said different electric vehicle connectors, and a Chinese GB mapping circuit electrically connected to said controller area network bus module for protocol mapping; and wherein said circuit is further structured to electrically connect the output of said power converter to said selected one of said different electric vehicle connectors to provide direct current power thereto.

19. The multi-standard compatible electric vehicle supply equipment of claim 14 wherein said circuit comprises a pilot circuit structured to detect connectivity of said one of said different electric vehicle connectors with said electric vehicle, and a switch structured to electrically connect the source of alternating current power to said selected one of said different electric vehicle connectors.

20. The multi-standard compatible electric vehicle supply equipment of claim 14 wherein said power converter comprises an alternating current to direct current power converter having a direct current output; wherein said circuit is structured to selectively electrically connect said direct current output to said selected one of said different electric vehicle connectors; and wherein said circuit comprises a protocol interpretation and mapping component and a universal interface between said protocol interpretation and mapping component and said alternating current to direct current power converter, said universal interface communicating with a unified internal protocol to said alternating current to direct current power converter.

* * * * *